Nov. 29, 1927.

M. L. CROUCH 1,650,981

MACHINE FOR MOLDING SOAP AND OTHER MATERIAL

Filed May 17, 1921    10 Sheets-Sheet 1

INVENTOR:
Marion L. Crouch.
BY
Arthur B. Jenkins,
ATTORNEY.

Nov. 29, 1927.

M. L. CROUCH 1,650,981

MACHINE FOR MOLDING SOAP AND OTHER MATERIAL

Filed May 17, 1921    10 Sheets-Sheet 4

INVENTOR
Marion L. Crouch.

BY Arthur Jenkins.
ATTORNEY.

Nov. 29, 1927. 1,650,981
M. L. CROUCH
MACHINE FOR MOLDING SOAP AND OTHER MATERIAL
Filed May 17, 1921 10 Sheets-Sheet 6

INVENTOR
Marion L. Crouch
BY Arthur B. Jenkins,
ATTORNEY.

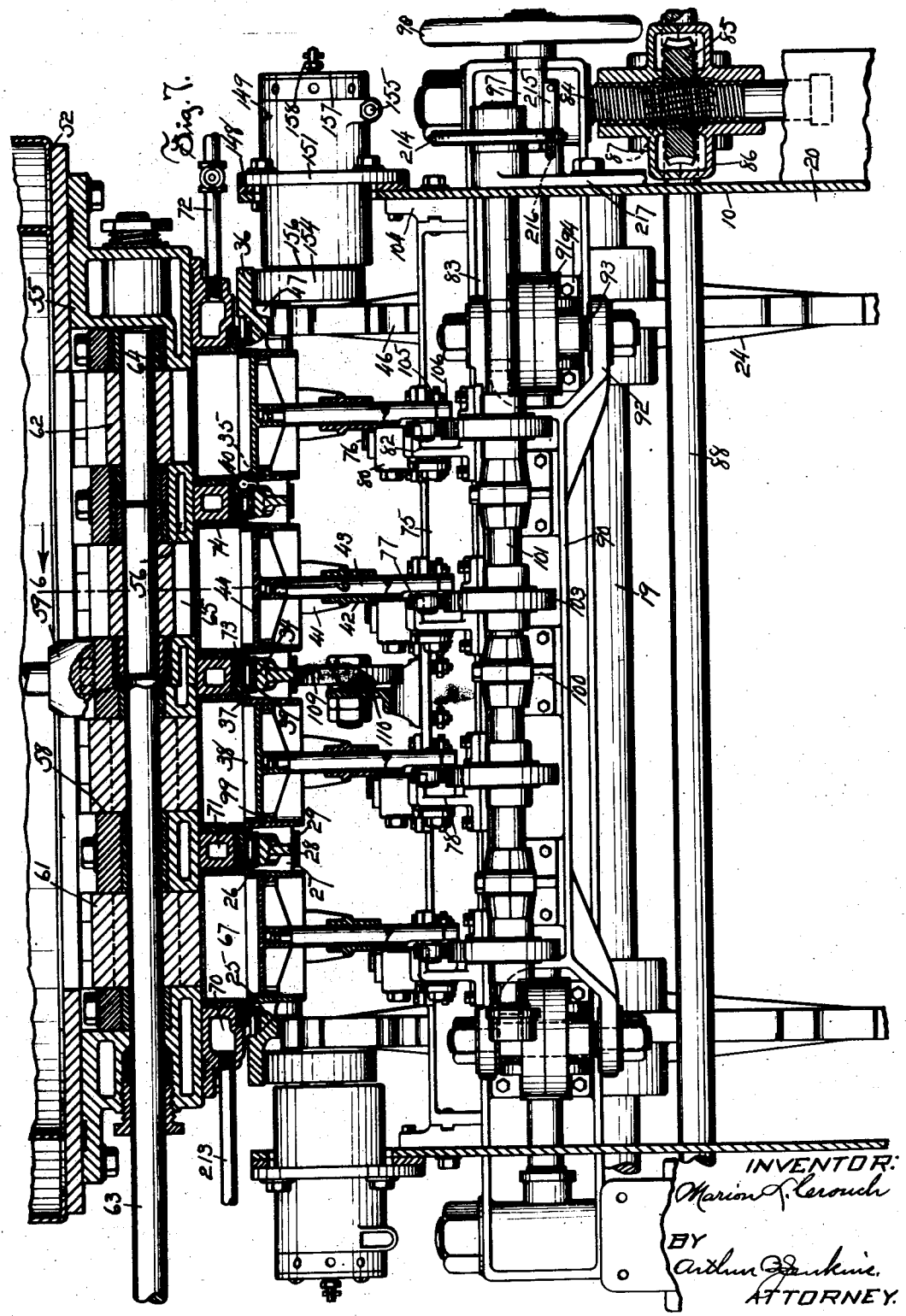

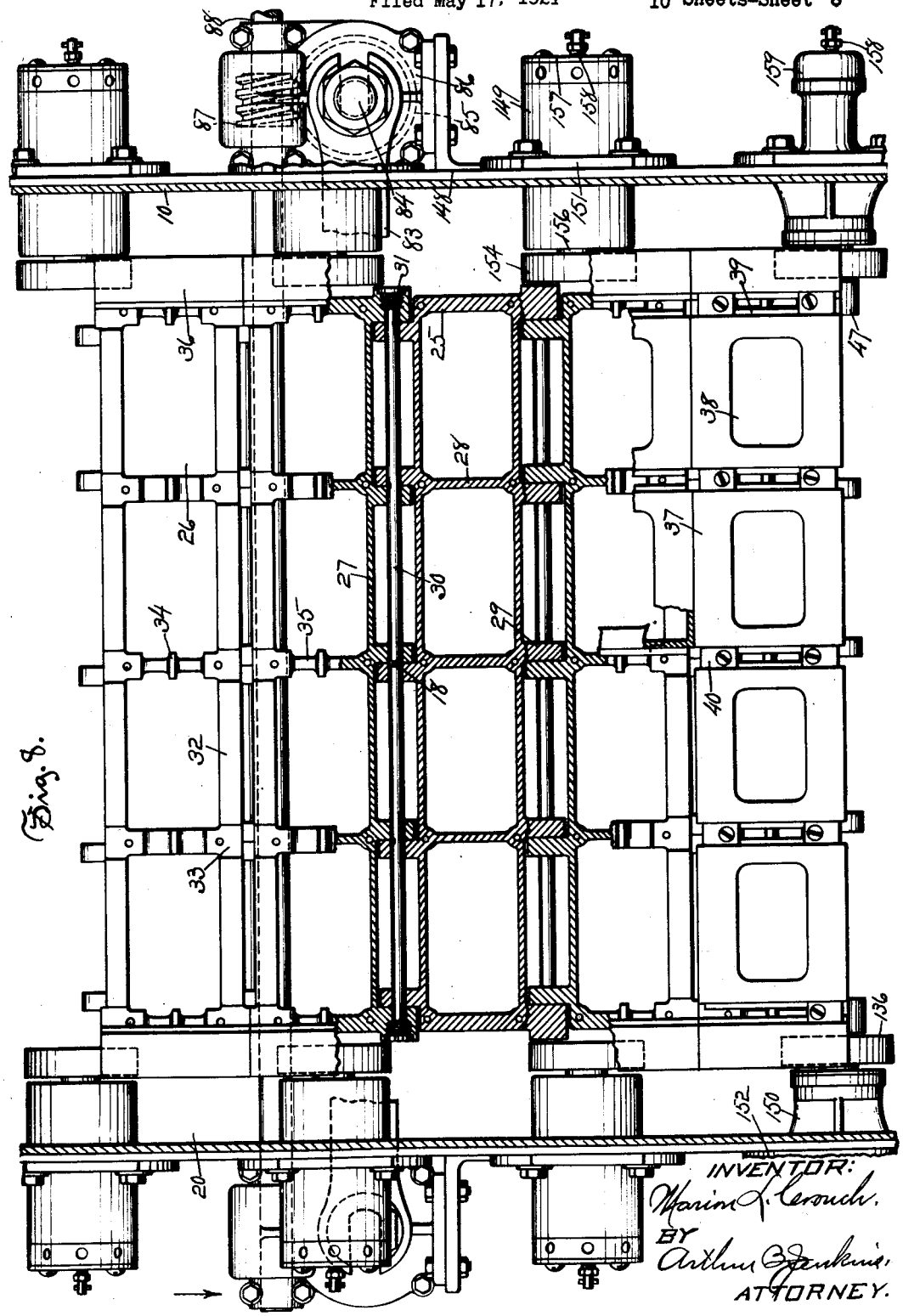

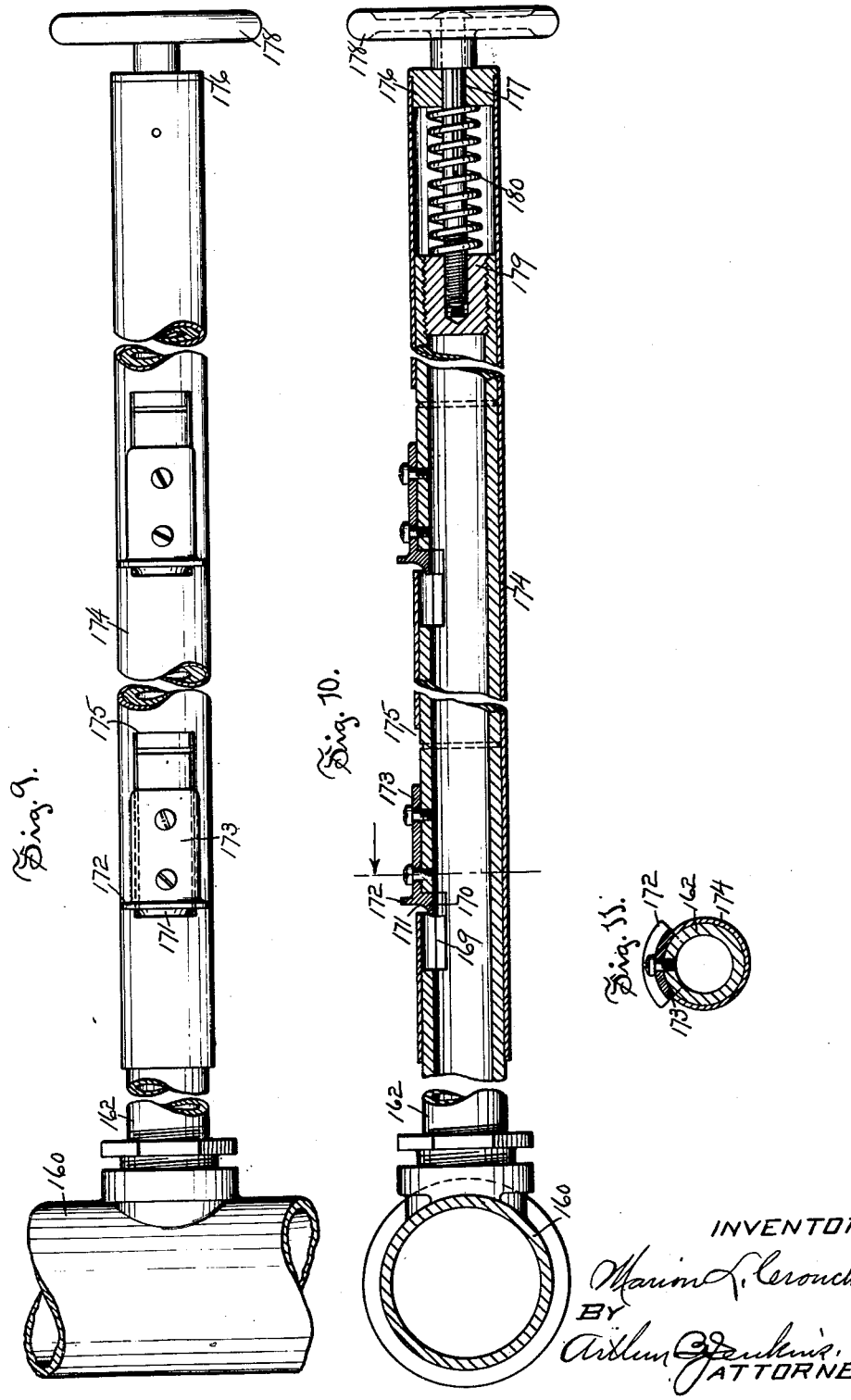

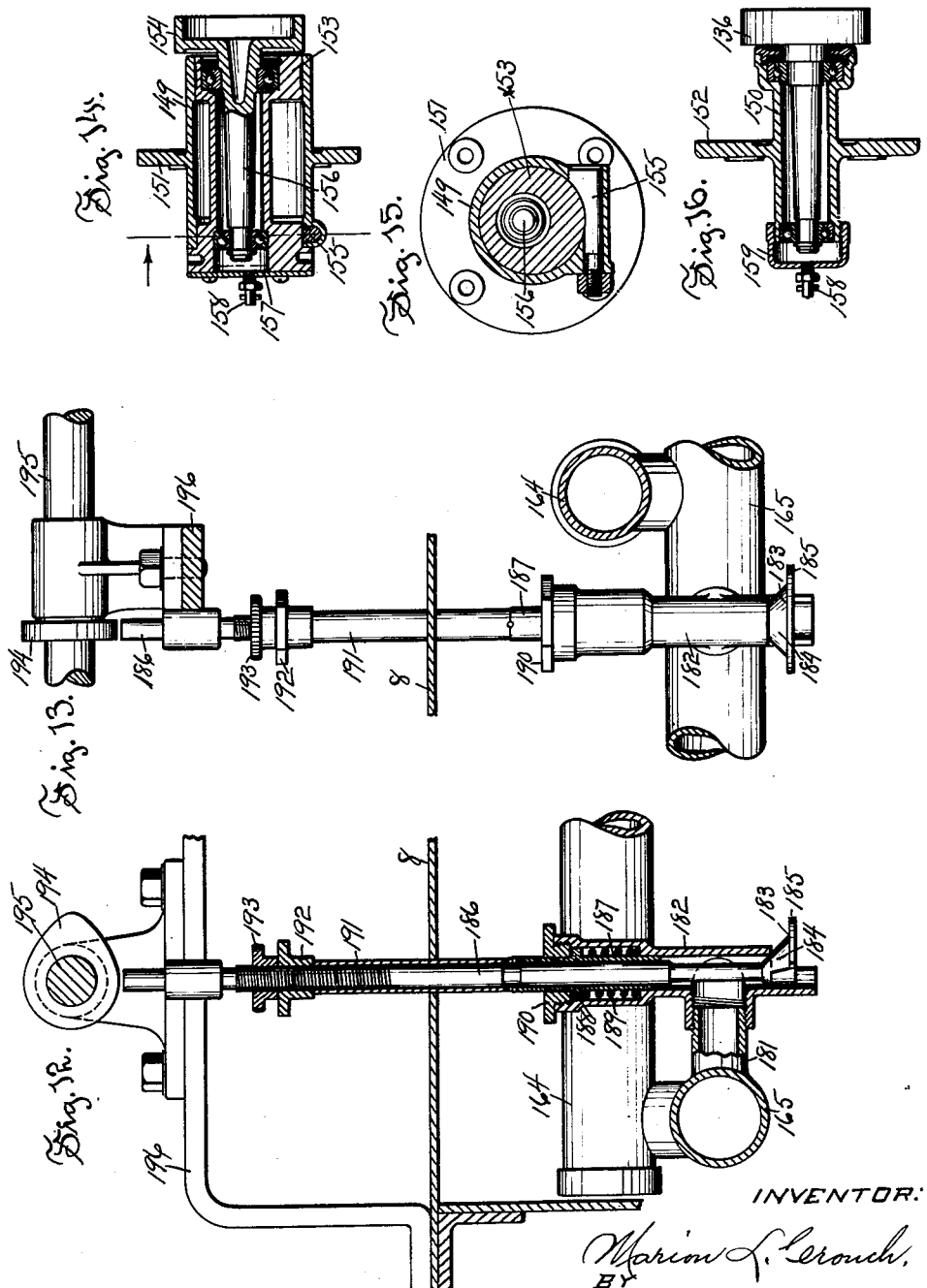

Patented Nov. 29, 1927.

1,650,981

UNITED STATES PATENT OFFICE.

MARION L. CROUCH, OF MILWAUKEE, WISCONSIN.

MACHINE FOR MOLDING SOAP AND OTHER MATERIAL.

Application filed May 17, 1921. Serial No. 470,223.

My invention relates to the class of machines that are used to give definite shape to material requiring a change of temperature to transform it from a more or less liquid state to a solid condition, and an object of my invention, among others, is to provide a machine of this class that shall operate to collect masses of material and dispose such masses in definite shapes and to so treat such shaped masses that in a very short period of time and at a minimum cost they will have properties imparted to them to enable them to maintain the shapes originally given to them. In short, when applied to soap, an object of the invention, among others, is to provide a machine by the use of which masses of soap material may be taken in semi-liquid condition, as from a crutcher, and introduced into molds within which, in a very short period of time, and at a very low cost, the soap materials will be hardened sufficiently to preserve the cake forms imparted to them by the molds.

A machine embodying my invention and in the construction and use of which the objects herein set out, as well as others, may be attained, is illustrated in the accompanying drawings, in which—

Figure 7 is a detail view, scale slightly reduced from Figure 6, on two planes, one being denoted by dotted line 7—7 of Figure 6 as to the upper left hand side of the figure, this being through the axis of one member of each set of feed wheels, and the other plane being through the axis of the other member of each set of feed wheels. Parts beyond are omitted.

Figure 8 is a top view (scale the same as Figure 7) of that part of the machine immediately under the crutcher, with parts broken away on different planes to show construction, and parts underneath being omitted.

Figure 9 is a detail outside view on enlarged scale of fragments of the horizontal sprayer pipes.

Figure 10 is a view, same scale, in longitudinal section through said pipes.

Figure 11 is a view in cross section through the same (same scale as Figure 10).

Figure 12 is a detail view illustrating the construction and operation of the vertical sprayers (scale being reduced as compared with Figures 9, 10 and 11).

Figure 13 is a detail view (same scale as Figure 12) from a point of view located at right angles to the point of view of Figure 12.

Figure 14 is a detail view (scale the same as Figures 7 and 8) in longitudinal section through the cases supporting the adjustable conveyor rollers.

Figure 15 is a view in cross section on plane denoted by dotted line 15—15 of Figure 14.

Figure 16 is a detail view (same scale) in longitudinal section through the supporting cases for the other conveyor rollers.

Figure 17 (Sheet I) is a detail view illustrating the means for rotating and holding the convexing shaft.

Figure 1:
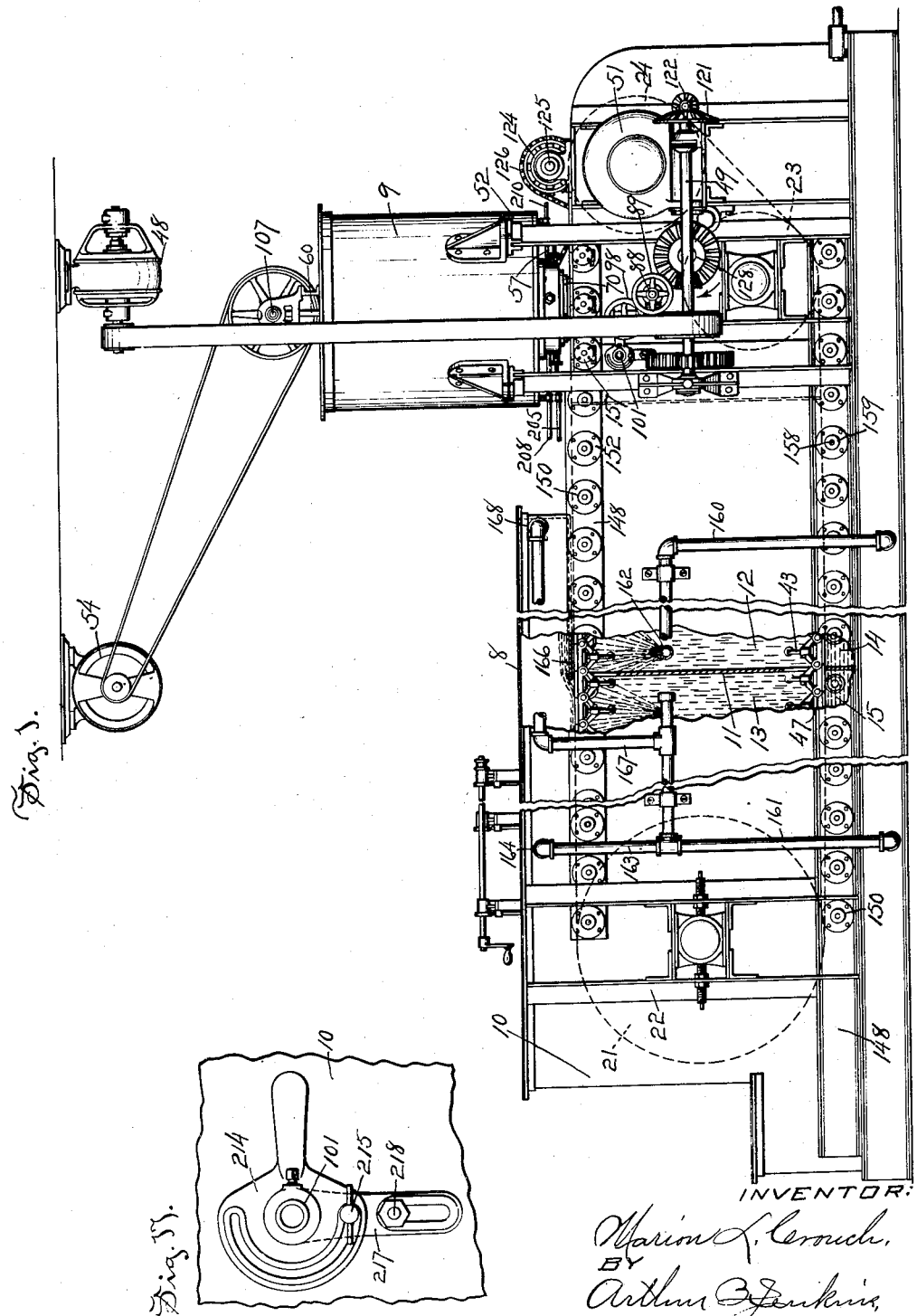
Figure 1 is a view in side elevation of my improved machine with sections intermediate its ends broken out and with parts broken away to show construction.

My improved machine is particularly adapted for use in the molding of cakes or bars of soap, and, therefore, the following description will be with reference to the machine adapted for such use, although it will be understood that the invention contemplates the molding and shaping of cakes or bars from other kinds of material, therefore it will be understood that the description herein applies to the formation of such other material as well as to soap matter. It will be understood that the different parts of the machine will be constructed of such metal or other material as may be found most suitable for the purpose in hand.

My improved machine may be described in general terms as comprising mechanism competent to form a shell or crust over the entire outer surface of a mass of material while contained in a mold, and sufficient to enable that mass to be readily treated without special care and promptly removed from the mold and thereafter to retain the form imparted to it by the mold without destroying such shape by subsequent operations thereon. The machine illustrated in the drawings herein embodies a structure that I have found to produce most satisfactory results, such machine comprising, generally described, a chamber or plurality of chambers in which a temperature or different temperatures suitable to produce the desired results is or are created: a conveyor, in the form of an endless structure with molds projecting from one face thereof, moving through said chamber or chambers; a source of supply of soap material, as a crutcher, for supplying said molds with such material that is cooled or chilled on all sides within the molds while being carried through said chambers by said conveyor; and apparatus for applying a cooling medium to the material while contained in the molds to congeal such material.

*Supporting frame and cooling tank.*

More specifically described said machine comprises an inclosing frame or cooling tank 10 that is divided by crosswise, vertically arranged walls or partitions 11 into a plurality (two in the machine herein shown) of inclosed chamber, an outer chamber 12 and an inner chamber 13. The bottoms of said chambers are formed as tanks 14—15 from which outlet pipes 16—17 extend to refrigerating apparatus to be hereinafter referred to. The front partition 11 creates a recess 20 at the front end of the frame in which driving and operating mechanisms are located. The case is provided with a raised portion 8 extending from a point in front of the partition 11 substantially to the back end of the machine, and for a purpose to be hereinafter described.

*Conveyor mechanism including mold plate structure.*

A pair of conveyor supporting wheels 21 is secured, one wheel at each end of a shaft located near the back part of the chamber 13. each end of said shaft being mounted in a suitable bearing supported as between posts 22 comprised in the frame and located at opposite sides of said chamber. said wheels being spaced apart a distance substantially that of the width of the conveyor. Pairs 23 and 24 of conveyor supporting wheels are similarly mounted within the recess 20 at the front end of the frame, the wheels 23 being located in the bottom of the recess near the back part thereof and the wheels 24 being located above the wheels 23 and near the front of the recess.

A conveyor is carried by said supporting wheels and is composed of a plurality of mold plate frames 25 all of the same construction and each of little width as compared with its length. Each frame has a number of mold openings (four in the structure shown herein) 26 arranged lengthwise thereof with aprons 27 extending across each frame from one end to the other in back and in front of the mold openings, the terms "front" and "back" being used herein with reference to the direction of movement of the conveyor as to its upper reach. Webs 28 extend from one apron to the other on each frame, and between the openings therein. said webs and aprons forming flanges extending from the inner face of each mold plate frame and forming the boundaries of said mold openings. Pivot lugs or knuckles 29 extend from opposite sides of each frame, preferably from the aprons 27, in the structure herein shown there being a number of these lugs arranged lengthwise of each frame in equal numbers on opposite sides thereof. The lugs on one side of each of the frames are so positioned with respect to the positions of the lugs on the opposite side thereof, that they will mate with lugs having positions similar to those last mentioned on the adjoining mold plate frames, in the structure herein shown the side face of each lug on one side of a frame lying just at one side of the plane of the opposite side face of a lug on the opposite side of said frame. Pivots extend through openings in each pair of mating lugs to pivotally attach adjoining mold plate frames one to the other, in the structure herein shown a single pivot rod 30 extending through the openings in all of the mating lugs at the meeting edges between each two adjoining mold plate frames, except the end lugs into which each rod extends only part way, screw plugs 31 inserted in the openings in the outer sides of the end lugs securing the pivot rods in place. These pivot rods are hollow from end to end for the reception of a lubricant that may be inserted at the ends and pass through ports 18. as shown in Figure 8 of the drawings.

Flat surfaces at the front and back of each mold opening comprise mold plate supports 32, and between said supports at adjacent mold openings, and preferably located a little below them, are mold plate rests 33 (see Figure 8) projecting beyond the mold plate supports toward the crosswise center of the frame, said rests constituting the upper edges of the webs 28 at the ends thereof, said webs being increased in thickness at their upper edges to create said rests, as shown in Figure 7 of the drawings. A central rest 34 is also formed on the upper edge of each web, said central rests being separated from the end rests by cutting the upper edges of the webs away on opposite sides of a lengthwise center line across the mold plate frames, openings 35 being thus formed, when the parts are assembled, extending from within each of the mold openings to the upper surface of the mold plate frame for a purpose to be hereinafter described, terms employed herein to denote vertical dimensions as to the conveyor being employed with reference thereto when in its position to receive material within the molds. Supporting flanges 36 are located at each end of each mold plate frame to support the conveyor in a manner to be hereinafter described.

Mold plates 37, each having an opening and a depending flange forming the walls of a mold 38 are secured to each mold plate frame with the molds projecting through the mold openings 26 and within the flanges extending around said openings. Each mold plate has a groove formed in its under surface near the front and back edges thereof to receive the mold plate supports 32 therein, and on opposite sides each mold plate has a lip 39 positioned to be supported on the rests 33 and 34. Clamp plates 40, of a length substantially equal to that of the rests 33, overlie the lips on adjoining mold plates, which lips are spaced apart sufficiently to permit clamp screws to extend between them into the upper edges of the webs 28 to secure the clamp plates, and hence the mold plates, in place. When thus arranged the front faces of all the mold plates in a mold plate frame lie in the same plane, and preferably in the plane of the front faces of the supporting flanges 36. As thus constructed the conveyor, when traveling in a straight path, is perfectly smooth as to its face, on all lines extending lengthwise thereof through the mold plates, the edges of the latter on contiguous mold plate frames being pressed close together with no appreciable space between them. The molds when traveling from the back to the front end of the machine along the bottom of the case or tank are upside down, and as they emerge from liquid in the bottom of the tank constituting the cooling medium the spaces between the molds and aprons 27 and webs 28 are filled with such liquid, said spaces, however, being quickly emptied by reason of the fact that the liquid will readily flow out through the openings 35.

A follower bracket of forked construction is secured appurtenant to each mold, the branches 41 of each bracket being secured, one branch to each of the aprons located on opposite sides of said mold, a hub 42 at the junction of each branch having an opening forming a bearing for a follower stem 43 having a follower 44 secured at its upper end within the mold, and comprising a movable bottom for the mold. Each follower has a spring 45 exerting its force on the follower stem in a direction transverse to the direction of movement of the stem, each spring acting to hold its follower in any position to which it may be moved to hold the material in a quiet condition and maintain the shape of the cake until it is properly chilled and discharged. Each follower has a peripheral flange on its back face to impart rigidity thereto and holes 99 are formed therethrough for the escape of the cooling liquid from within it to the outer face of the conveyor just after the cakes have been ejected and when the followers are projected, by mechanism to be hereinafter described, slightly beyond the front face of the molds (see Figure 5) and enough to open the holes 99 for the flow therethrough of such liquid. Notches 46 are formed in the peripheries of each of the conveyor supporting wheels 21, 23 and 24 to receive the end lugs or knuckles at opposite ends of each of the mold plate frames, said lugs or knuckles constituting conveyor driving lugs 47 coacting with the several conveyor supporting wheels to drive the conveyor.

*Driving mechanism.*

Figure 2:
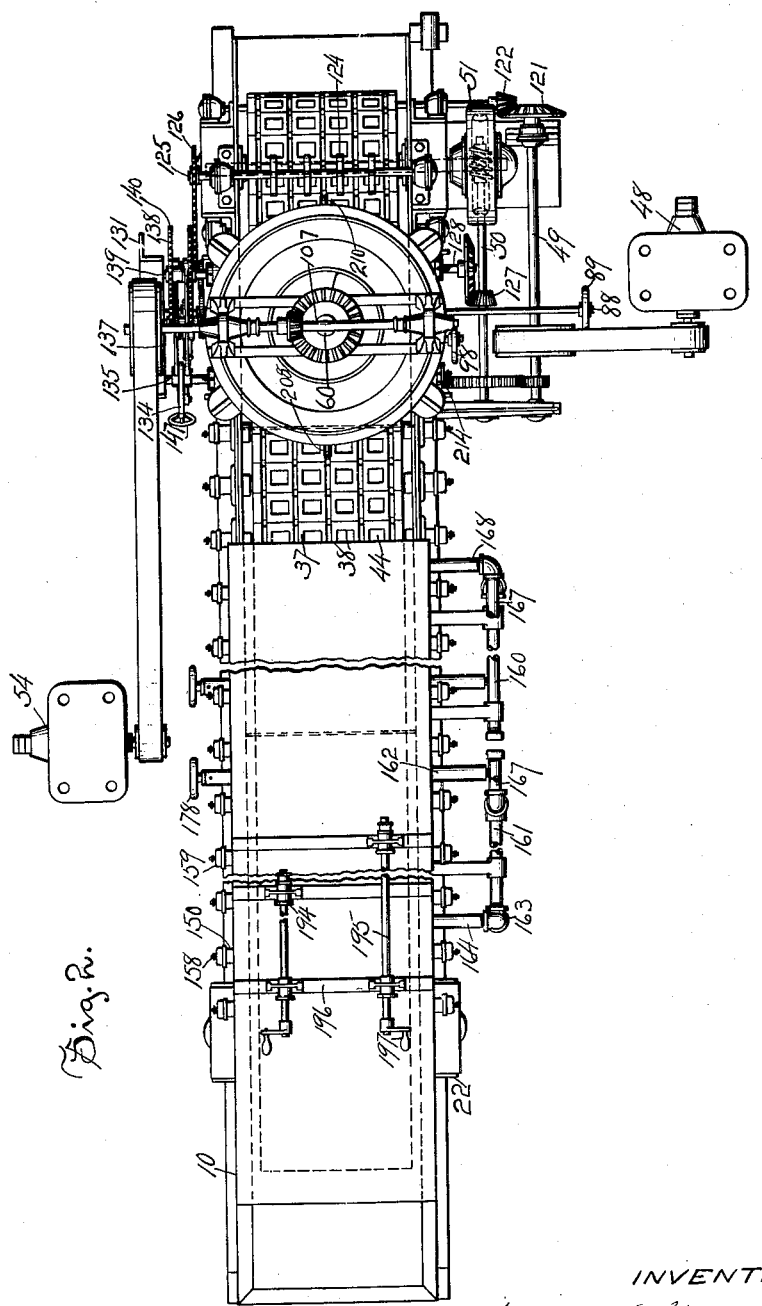
Figure 2 is a top view of the same.

The conveyor and other mechanisms are driven as by means of a motor 48 operated and connected as by a belt with a driving shaft 49 mounted in bearings in brackets supported from the side of the inclosing frame 10 as shown in Figures 1 and 2 of the drawing. The shaft 49 is connected as by an intermeshing pinion and gear with a conveyor driving shaft 50 mounted at one end in a bracket supporting the shaft 49 and at its opposite end in a gear housing 51 supported from the side of the frame 10, said shaft 50 having a worm intermeshing with a worm gear (see Figure 2) secured to the shaft 19 of the conveyor supporting wheels 24 to drive said wheels and thereby the conveyor in a manner that will be readily understood from the foregoing description.

A crutcher 9, of any ordinary form and operated in any well known manner, except as to mechanism located in the lower end thereof and to be hereinafter described, is supported by posts secured to the side of the frame or tank 10, briefly stated, mechanism within the crutcher, except as hereinafter noted, being operated as by means of a crutcher driving motor 54 belted to a pulley on a crutcher driving shaft 107 geared to the shaft 60 of a worm 108 comprised in the crutcher mechanism, as shown in Figure 2 of the drawings.

Feeding mechanism.

My improved machine comprises a feed case or jacket 55 secured to the under side of the lower end 52 of the crutcher, the walls of said case comprising a jacket for a heating medium, as steam or hot water, said jacket having passages 56 constituting heating chambers in the peripheral and dividing walls, which chambers have an inlet pipe 202 connecting them with a steam siphon circulator 203.

A steam, or hot water, inlet pipe 204 extends from any suitable source of supply and is connected with the siphon 203, said pipe having a valve 205 for controlling flow therethrough. An extension 206 from the siphon 203 is connected by a branch pipe 207 with the jacket comprising a part of the lower end 52 of the crutcher, which jacket may be supplied with a heating medium as hot water through the connections just described, the branch pipe 207 having a valve 219 as a means for controlling flow to said jacket. A water inlet pipe 208 is connected to the extension 206, and has a valve 209 as a means for controlling flow of water.

Figure 6:
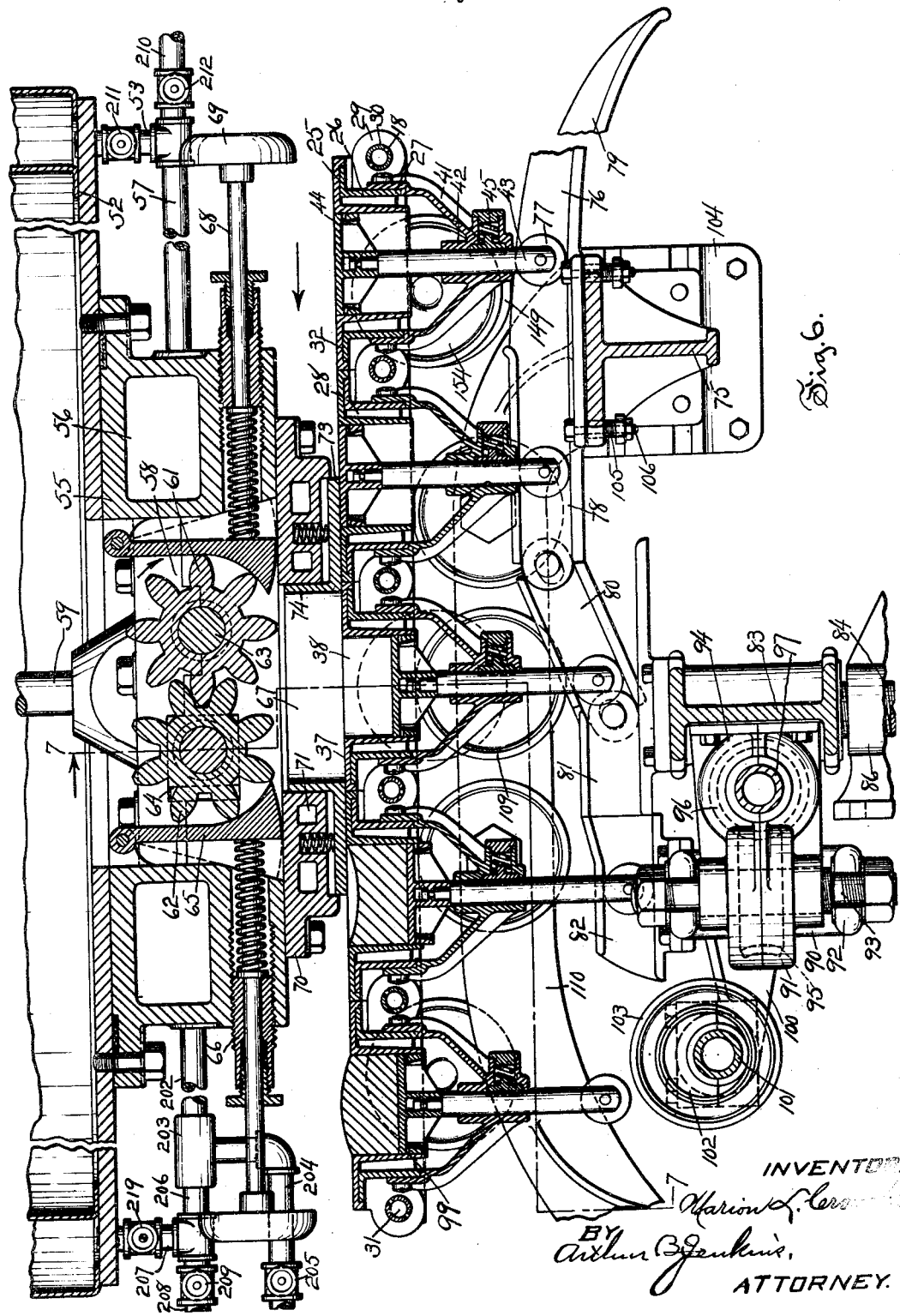
Figure 6 is a detail view, scale further enlarged, in vertical longitudinal section, partially on a plane denoted by the dotted line 6—6 in Figure 7, showing the feed devices and the mold plunger operating mechanism, no part of the frame being shown but supporting members at the bottom of the figure being shown in full or cut on a plane nearer the observer than the general plane of section.

Circulation of fluid through the jackets and chambers described is promoted by means of a main outlet pipe 210 connected with an outlet 57 from the chambers 56 and with an outlet branch 53 from the lower end of the jacket surrounding the crutcher, said branch having a valve 211 as a means for controlling flow through it, and the pipe 210 having a valve 212 as a means for controlling flow therethrough, all as shown in Figure 6 of the drawings.

By means of the arrangement of pipes above described and under ordinary working conditions the valves may be manipulated for the purpose of admitting cold water or steam to any or all of the compartments. To fill all of the spaces or compartments with cold water the valves 205 and 212 should be closed and the valves 219 and 211 should be open. By now opening the valve 209 the entire system will be filled with cold water.

To heat the water in both the upper and lower jackets 52 and 55, or to admit steam to said jackets, the valves 209 and 212 should be closed while the valves 219 and 211 should be opened and steam may then be admitted by opening the valve 205. To heat the lower jacket 55 with steam only the valves 219, 209, 211 and 212 should be closed, the steam being then turned on through the valve 205.

It will thus be seen that different fluids may be supplied to the different jackets as desired, it being understood that there is an overflow in the larger jacket 52 at the high water level. To drain out the entire contents of all of the jackets it is necessary only to open the valves 219, 211 and 212, the valves 205 and 209, of course, being closed. It will be understood that the outlet valves may be employed whenever it is desired to promote circulation.

The feed case 55 has feed wheel compartments 58 equal in number to that of the molds in each of the mold plate frames, said compartments 58 being positioned to register one with each mold as the conveyor carries the molds underneath said case. A step bearing 59 for the lower end of a crutcher shaft 60 is secured to the upper edge of a dividing wall between said compartments.

A pair of feed wheels 61—62 is located in each of the compartments 58, these wheels being intermeshing toothed members, said members 61 being secured to a main feed shaft 63 mounted in the feed case and extending through said compartments and serving as the driving means for the other of said wheels, each of which is secured to a short feed shaft mounted independently of the others with its ends in boxes 64 movably located in slots in the side walls of the compartment containing said wheel.

Movable walls 65 are located on opposite sides of each pair of wheels and in line with both of said wheels, in the construction herein shown said walls being pivotally mounted at their upper ends and extending downwardly into a compartment, and with their lower ends substantially in sliding contact with the bottoms of the compartment. The surfaces of these walls toward the wheels are formed, as to a portion at least, on the arc of a circle corresponding to that formed by the outer edges of the teeth of said wheels, and the spaces between such teeth are all of substantially the same size to each contain the same amount of material as the other when such spaces are closed by contact of the teeth with the surfaces of the movable walls, as shown in Figure 6 of the drawings. This is for the purpose of positively supplying all of the molds each with the same and a definite amount of soap as the others, the pressure under which the soap is supplied to each mold being the same as that under which it is supplied to all others, and this insures a uniformity in the amount of soap contained in each of the cakes molded during a certain "run" irrespective of the high rate at which the machine may be operated.

In order that this pressure may be varied to suit conditions as to different characters of soap material as to density or otherwise, I provide means for permitting the feed wheels of each pair to separate under tension to a slight extent, the degree of which tension may be varied, in the construction herein shown, a spring, that is located in a recess in each wall of each compartment, and that thrusts against the back of each movable wall 65, being supported at its opposite end by a tension adjusting screw 66 extending through a threaded opening in the feed case into said recess, these screws being provided outside of the case with any suitable means, as an angularly shaped end, to receive a wrench for turning them. By this arrangement, whenever the pressure in the chambers 67 underneath the feed wheels becomes excessive the springs will yield, allowing the wheels to separate, and the excess material will pass upwardly between the wheels to be again returned as before to the chamber 67. Similarly any hard foreign material that may accidentally be present in the soap will be allowed to pass by reason of the yielding character of the walls and without injury to the machine. Push rods 68 extend through the screws 66 into contact with the tension springs, said rods being provided with hand grips 69 for the purpose of forcing the rods inwardly to press the movable walls 65 against the feed wheels, whenever said walls may have been moved away from said wheels. The push rods 68 also when pushed in by hand will indicate by their relative positions whether or not any foreign matter or hard soap is lodged between the teeth of the feeding gears, thus denoting which set of gears is not working properly.

A crutcher plate 70, secured to the under side of the feed case 55, extends across the crutcher and is provided with a number of openings equal to those in the mold plates. Passages 71 in the peripheral and dividing walls of this plate are supplied with a heating medium as steam by a pipe 72, as a means for maintaining the heated condition of the soap material in its passage to the molds, and an outlet pipe 213 may be employed for the discharge of water from said crutcher plate. A packing plate 73 is located appurtenant to each of the openings in the crutcher plate, the faces of said packing plates being in contact with the faces of the molds, flanges 74 on the back faces of the plates extending into the openings in the crutcher plate, the openings bounded by said flanges and of a size somewhat greater than the openings in the molds constituting the mold supply chambers 67. The plates 73 are resiliently supported, as against springs projecting into recesses in the under surface of the crutcher plate, as shown in Figure 6 of the drawings. This causes each of the packing plates to so conform its position with respect to its special row of molds extending lengthwise of the conveyor as to completely pack the joint between the mold plates and the packing plates and thus prevent the escape of soap material between the conveyor and crutcher plate.

Figure 4:
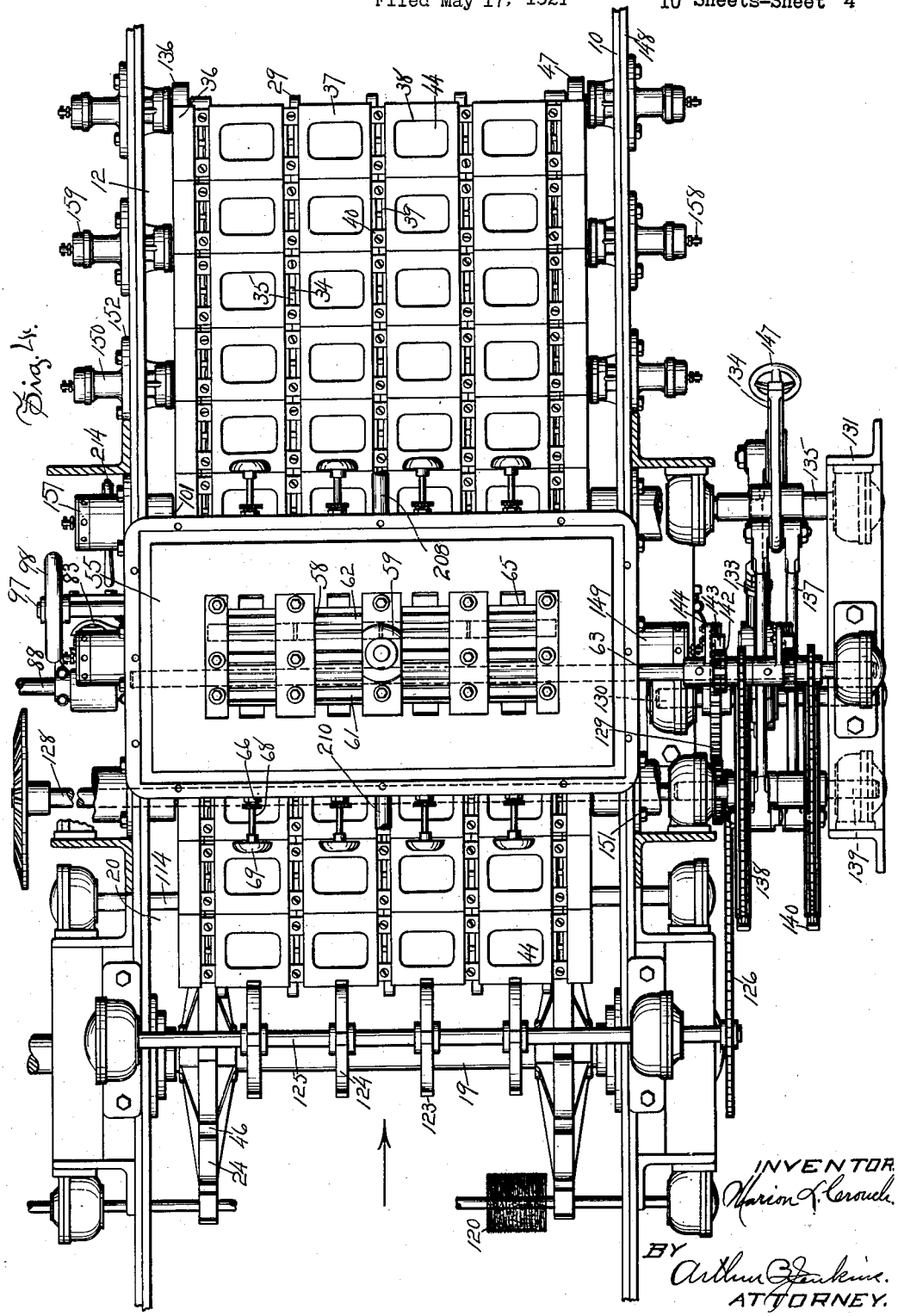
Figure 4 is a plan view of the front end of the machine on plane denoted by dotted line 4—4 of Figure 3, and on a scale the same as Figure 3, the ends of crosswise shafts being broken off, and part of the conveyor being removed at its rear end.

A feed driving pinion 127 on the conveyor driving shaft 50 meshes with a bevel gear on a feed driving shaft 128 extending through the frame to the opposite side thereof where it supports a pinion in mesh with a feed lever operating gear 129 secured to a feed lever operating shaft 130 mounted in bearings on cross bars, one of said bars extending between the posts supporting the crutcher and the other between the side posts of an auxiliary frame 131 spaced from the main frame or tank on the side thereof opposite the crutcher and employed to support the ends of various shafts, especially as illustrated in Figure 4 of the drawings. An eccentric 132 is secured to the shaft 130 and is connected as by a strap and connecting rod 133 with a feed lever 134 secured to a rock shaft 135 supported in bearings on the main and auxiliary frames as shown in Figure 4.

Figure 3:
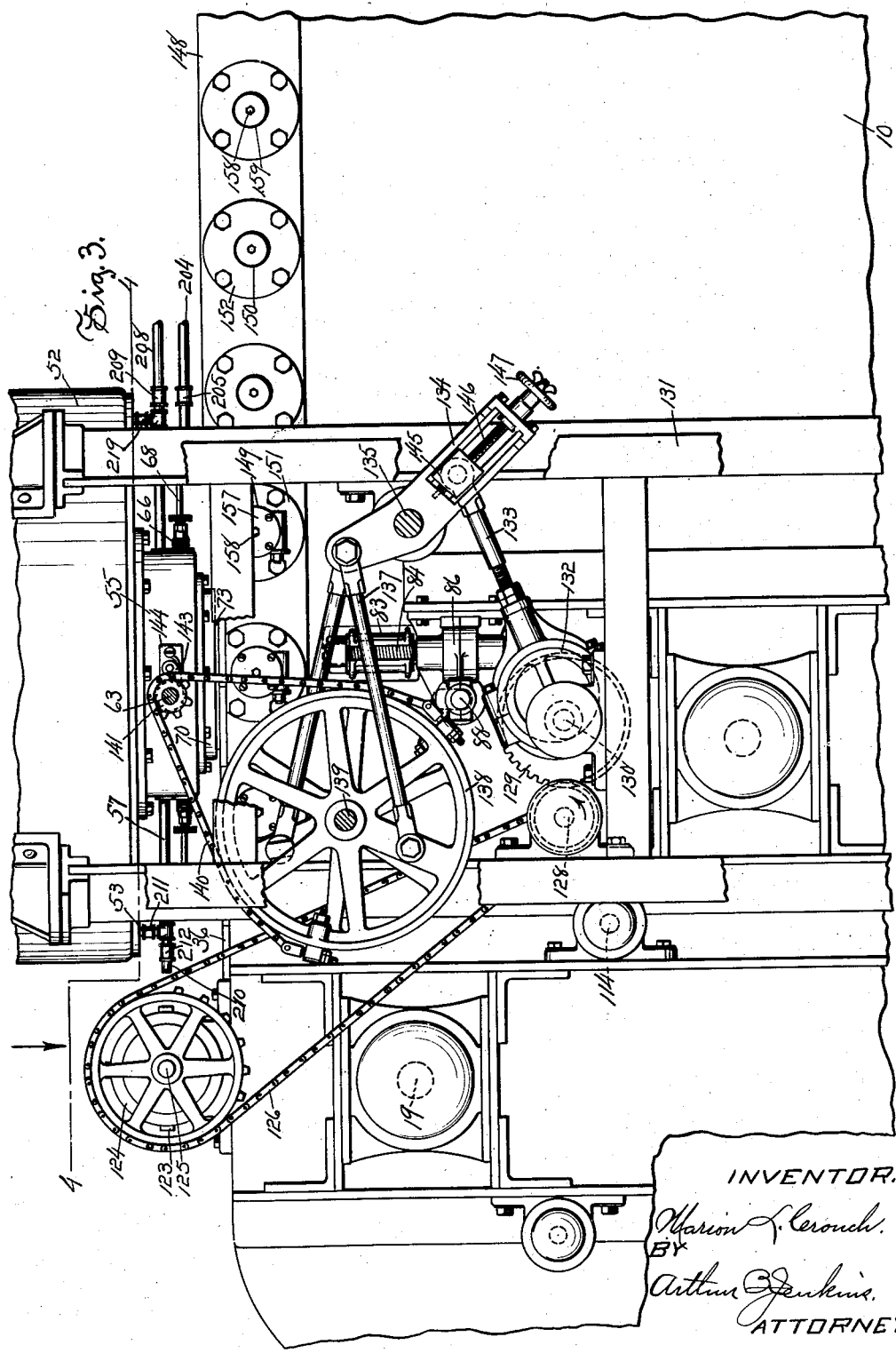
Figure 3 is a view in elevation, scale enlarged, of the opposite side of the machine from that shown in Figure 1.

The lever 134 is connected by rods 137 with oscillating feed operating wheels 138, there being two of these wheels loosely mounted on a shaft 139, the connection of said rods with said wheels being a crank connection so that an oscillatory movement is imparted to both of the wheels, each crank connection being on the opposite side of the shaft 139 from the other crank connection so that when the lever 134 is moved in one direction the wheels will be simultaneously rotated in opposite directions. Each of said wheels has a sprocket chain 140 adjustably secured at its opposite ends as by take-up bolts to opposite sides of said wheels, as shown in Figure 3, each of said chains passing over and in engagement with a feed sprocket 141 loosely mounted on the main feed shaft 63. Each of said sprockets is rigidly connected with a feed ratchet 142 engaged with a feed pawl 143 mounted on a feed arm 144 secured to the shaft 63.

In order to vary the amount of throw of the feed lever 134 and hence the amount of soap material that will be supplied to the molds at each step-by-step movement of the feed mechanism the connecting rod 133 is adjustably secured to the lever 134 as by means of a feed adjusting block 145 mounted for sliding movement and guided in a slot in the lever and engaged by a feed adjusting screw 146 rotatably mounted in the lever and extending lengthwise thereof through said slot and through said block, said screw being held from lengthwise movement and having a feed adjusting hand wheel 147 secured to its outer end, whereby the pivotal connection of the rod 133 may be varied as to its distance from the shaft 135 comprising the fulcrum for said lever. It will be noted that the construction just described provides a mechanism whereby a one step and feeding movement is imparted to the feed device at each movement of the lever in either direction, and consequently at each half turn of the eccentric, thereby eliminating the lost motion that would otherwise ensue were only one feed operating wheel used and the feed mechanism thereby caused to rest while the lever was making a non-working movement in one direction. When one of the wheels 138 is turning to effect these movements the other of said wheels is moved backwardly into position to effect its feed movement in the next operation of the lever 134. The gears and other operative parts of the feed mechanism are so timed one with respect to another that the chamber 67 will be supplied with sufficient material under proper pressure to supply all of the molds each with the same amount of material, and it will be further understood that all of the intermeshing gears and connected parts described herein and illustrated in the drawings for effecting certain movements will be so timed one with respect to another as to obtain the movement desired.

Follower operating mechanism.

The followers when operated by the ejecting mechanism hereinafter described are projected a slight distance out of the mouths of the molds for the escape of liquid through the holes 99 in the flanges on the bottoms of the followers, as hereinbefore described and I, therefore, provide means for placing such followers flush with the mouths of the molds before said molds pass underneath the crutcher plates, so that the soap material will be received upon the followers without intervening air spaces, and to maintain this result during the filling of the molds means are provided for gradually withdrawing the followers at substantially the same rate of speed as that at which the soap enters the molds. This positive means for withdrawing the followers also aids in maintaining even pressures of the soap materials in all of the molds. This pressure of the soap materials within the molds would, unless prevented, cause such material to be pressed up above the mold plates just as soon as the mouths of such molds in their movements begin to open beyond the crutcher plate, thus causing each cake of soap on one side to be thicker than on the other side, and I, therefore, provide means to prevent this by withdrawing the followers to a slight degree to relieve the pressure after the molds have been filled. In order that the shrinking of the cakes shall not produce concavities on the exposed faces thereof, means are provided for raising the followers to a slight extent after the molds have passed clear of the crutcher plate, such exposed faces being thus given each a convex shape, whereby when the material shrinks the convex shape will flatten and give a flat top to the cake. The apparatus for accomplishing these results comprises a stationary supporting beam 75 for the follower operating mechanism adjustably secured, as by means of interengaging ribs and grooves and screw bolts (see Figures 6 and 7) at its opposite ends to brackets 104 secured to opposite sides of the frame, stationary track members 76, one for each row of followers, being arranged lengthwise of the conveyor and adjustably secured to said beam in position to receive rollers 77 supported at the lower end of each follower stem 43. The track members 76 each have a groove 78 in one side to receive the rollers on the followers as they are carried along said members by the conveyor, and they also each have a guide 79 sloping downwardly at the bottom of one end to receive the rollers. This guide and its side wall comprise the front end of such member and of each set of track members that operates to guide the rollers on the followers into the grooves in the track members to raise the followers flush with the mouths of the molds as hereinbefore described and to maintain them in these positions until the molds reach the proper places underneath the crutcher plate for the filling operation to begin. One end of a filling track member 80 is pivotally attached to one end of each of the members 76 and the opposite end of each of the filling track members is pivotally attached to a holding track member 81 as by means of a bolt and slot connection as shown in Figure 6 of the drawings. The filling track members 80 operate to withdraw the followers at a speed the same as that at which the soap material is forced into the molds, and the holding track members 81 maintain the followers in their retracted positions for a brief period of time. A relieving track member 82 adjoins each of the holding track members with the ends of said adjoining track members 81 and 82 preferably in sliding contact, all of the track members appurtenant to a single row of followers having groves similar to the grooves 78 above described opening from one into another so that the roller on each of the followers is actuated in its movement to enter a groove at one end of a set of track members and to pass out of the groove at the opposite end of said set of track members, the stationary, filling, holding and relieving track members just described constituting a follower operating track for operating each row of followers on the conveyor. The relieving track members operate as hereinbefore described to withdraw the followers each to a slight extent to relieve the pressures within the molds and prevent the advancing edges of the masses from bulging up beyond the edge of the filling plate or the crutcher plate.

The filling track members extend downwardly from the stationary track members for the purpose above described and the holding and filling track members are preferably supported at adjoining ends on an adjustably mounted supporting beam 83 arranged for vertical adjustment and extending across the frame from side to side, and as shown herein through the sides of the frame or tank. The ends of this beam are slotted to receive track adjusting screws 84, the latter being flattened on opposite sides to fit said slots, thereby producing shoulders upon which the ends of the beam rest, and the adjusting screws thereby being held from rotation in said beam. A nut fitting each of the adjusting screws at opposite ends of the beam may be employed for securing it and the screws tightly together.

The screw threaded portion of each of said adjusting screws fits a threaded opening in the hub of an adjusting worm wheel 85 in a housing 86, each of said housings being secured to the frame at the outside thereof. Each of said housings also incloses an adjusting worm 87 meshing with said worm wheel and secured to an adjusting shaft 88 extending through the tank from side to side and mounted at each end in one of said housings. This shaft is provided at one end with an adjusting hand wheel 89 by means of which the filling track members may be adjusted as to their positions to control the amount of soap material that will be admitted to the molds during the filling operations and hence determine the thickness of the cakes being made.

The relieving track members are also vertically adjustably supported on a relieving track beam 90 forked at each end and within the frame to receive gear housings 91 between said forks, the branches 92 of which are slotted to receive adjusting screws 93 at opposite ends of the beam which screws are reduced in diameter at their ends to be received within said slots and to which branches said screws are secured as by means of nuts fitting their screw threaded ends. The beam 90 is supported by brackets 94 secured to and projecting from the side of the beam 83, this arrangement causing the beams 83 and 90 to be simultaneously moved for adjusting purposes, and permitting the beam 90 to be adjusted independently of the beam 83 for relieving the pressure more or less as may be required, depending upon the consistency of the soap material, the pressure requiring to be relieved more on thin material than on a thicker material. During such adjustment the track members 81 and 82 slide in contact one with the other. The screws 93 are mounted in the housings 91, their screw threaded bodies fitting screw threaded hubs or worm wheels 95 within the housings 91, said worm wheels meshing with worms 96 secured to an adjusting shaft 97 extending across the machine from side to side and having an adjusting hand wheel 98 secured to its end, said hand wheel serving as a means for adjusting the beam 90.

Bracket arms 100 are secured to and project from the track beam 90, a convexing shaft 101 (preferably hollow) being mounted in bearings in said arms and having convexing eccentrics 102 secured thereto in the paths of travel of the follower stems 43, convexing rings 103 being mounted on said eccentrics in position to receive the rollers 77 on the follower stems and raise the latter slightly. It will thus be seen that by turning the shaft 101 the rings may be raised or lowered and the degree of movement of the followers 44 changed to meet conditions as to different densities of the material in making different kinds of soap. These adjustments must be made whenever a different kind of soap is made, and this ensures a flat top on each cake by raising the cake above the top of the mold to the extent that it will contract in hardening and cooling.

A manually operated or adjusted convexing plate 214 is secured to the shaft 101, a clamp post 215 with a threaded end 216 projecting through a slot in the plate being employed to hold the latter in different positions of adjustment. Said stud projects into a bracket 217 loosely mounted on one end of the shaft 101 and held from turning movement by means of a stud 218 projecting from the side of the frame through a slot in the bracket, as shown in Figure 17 of the drawings, a nut fitting the screw threaded end of said stud.

The track members 76 are attached to the supporting beam 75 for vertical adjustment thereon as by means of tubular screws 105 screw threaded into the flanges of the bar and clamped therein by means of nuts on the ends of clamp bolts 106 projecting through flanges on the track members 76 and through said tubular bolts to secure them in place, as shown in Figures 6 and 7 of the drawings. This adjustment is to ensure the proper positions of the followers during the filling operations, which positions may change from time to time owing to wear and by reason of other conditions.

As a means for supporting the conveyor at its crosswise center and underneath the crutcher to prevent sagging at this point, and hence a chance for escape of soap between the conveyor and crutcher, a set of packing rolls 109 is mounted on studs secured to and projecting from the side of a roller supporting bar 110 resting upon and secured at one end to the beam 75 and at its opposite end to a roller-supporting beam 111 secured to the side parts of the frame (see Figure 5) and extending across it, said beam being provided at its opposite ends with adjusting bolts and screws similar to those for adjusting the beam 75 hereinbefore described and for the same purpose.

Figure 5:
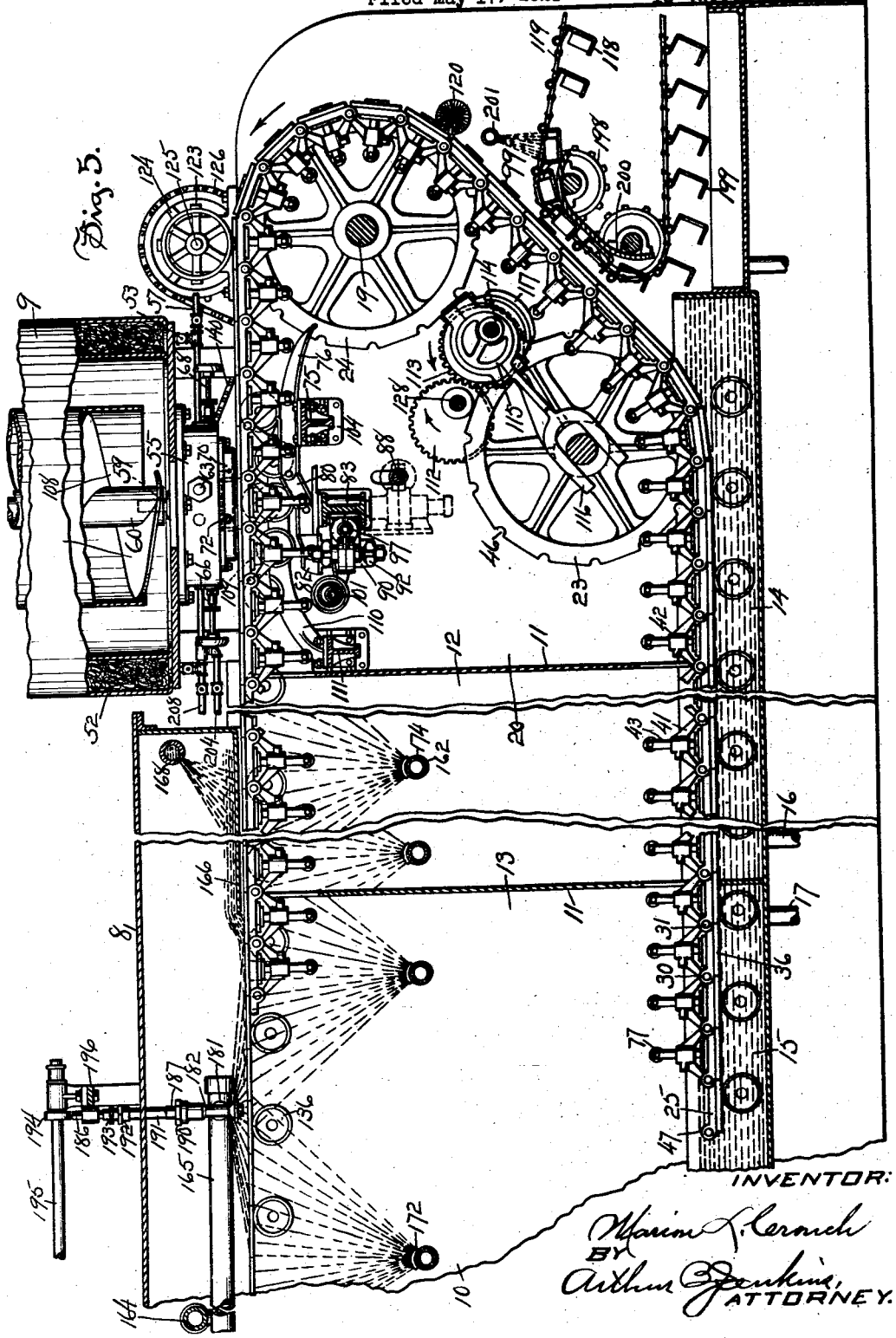
Figure 5 is a detail view (scale enlarged with respect to Figures 1 and 2, but reduced as compared with Figures 3 and 4) in vertical longitudinal section of portions of the machine, and especially of the front end thereof, and with parts broken away.

The conveyor, as it leaves the tank 14, travels between the wheels 23—24 in an inclined position with the mouths of the molds opening downwardly, in which position the cakes of soap are ejected from the molds. This ejecting mechanism comprises a pair of intermeshing eccentric gears 112—113, the former being secured to the shaft 128 hereinbefore described, and the latter to a shaft 114 extending across the frame and mounted in bearings secured to opposite sides thereof. Ejecting eccentrics 115 are secured to the shaft 114, one of said eccentrics being located appurtenant to each row of follower stems 43, extending lengthwise of the conveyor, each of said eccentrics having a strap with a forked steadying arm 116 extending therefrom and straddling the shaft of the conveyor supporting wheels 23 as shown in Figure 5 of the drawings. Each of said straps also has a rib supporting an ejecting shoe 117 in the path of a row of rollers on the stems 43 whereby the followers are moved to eject the cakes of soap that are received within receivers 118 on a conveyor 119 to be hereinafter described and by which the cakes are carried away, as to a drier, the installation of the present machine contemplating the immediate passage of the cakes of soap through a drier for the purpose of permitting them to be completely hardened and also for the purpose of removing all excess moisture, such drier not being shown herein.

These ejecting shoes have two movements, to wit: an eccentric movement and a reciprocating ejecting movement. It will be noted that the ejecting movement of each shoe at one period is very slow while at another period it is comparatively fast, the increase and decrease from one rate to the other being gradual. These ejecting movements are so timed with respect to the movement of the conveyor that the periods of slow movement of the shoes will take place at the time the rollers on the follower stems make contact with them, at which time the shoes are in their retracted positions, and the most rapid movements will take place at a time when the shoes are in their most advanced positions and the cakes are being fully ejected, so that while a part of each ejecting movement of a shoe is slow, such movement as a whole is fast, the slow movements and the accelerated speeds taking place at such times as will best effect the results desired.

The movements of the ejecting shoes is such as to project the followers a slight distance beyond the mouths of the molds, so that the holes 99 in the follower flanges will be exposed and the water within said flanges may escape to the front of the conveyor as hereinbefore described and as shown in Fig. 5. In these positions the followers may be acted upon by brushes 120 secured to a shaft supported in bearings on the side parts of the frame and driven as by means of a gear 121 on the shaft 49 meshing with a bevel gear 122 on the shaft supporting the brushes, and as shown in Figures 1 and 5 of the drawings.

In order to push the followers backwardly so that they will readily pass under the crutcher plate without catching against the edge thereof in the movements of the conveyor, follower depressors 123 are provided, as herein shown these depressors being fingers located on wheels 124 secured to a depressor shaft 125 mounted in bearings in the side parts of the frame and driven as by means of a sprocket chain 126 extending from a sprocket on the shaft 128 to a sprocket of the shaft 125 as shown in Figures 3, 4 and 5 of the drawings. These depressors are timed to rotate so that each successive finger on each wheel will make contact with successive followers in a row on the conveyor and thereby depress all of the followers below the mouths of the molds for the purpose above stated.

*Conveyor supporting mechanism.*

As hereinbefore set out the conveyor is supported at its ends by the supporting wheels 21, 23 and 24 supported in pairs, it being here noted that the wheels 21 are mounted in bearings adjustably movable toward and from the wheels at the opposite end of the machine for the purpose of keeping the conveyor taut, and as shown in Figure 1 of the drawings. Between the pairs of supporting wheels at the front and rear ends of the machine the conveyor is supported upon rollers spaced to provide a suitable support for the upper and lower reaches of the conveyor, as shown herein straps 148 of metal being secured to the upper and lower edges of the frame or tank on the outside thereof, with holes formed through said straps and through the walls of the tank to receive roller bearing cases 149—150 each having flanges 151—152 to receive bolts as a means for securing the cases to the frame. Packing rollers are contained in the cases 149 underneath the crutcher and are adjustably mounted to cause the mold plates 37 to travel at all times in contact with the packing plates 73 in such manner as to prevent the soap material from leaking out between said plates and thus escaping from the crutcher. In the structure herein shown an eccentric support 153 is adjustably mounted in each of the cases 149, said supports extending through the case and having a flange on one end to receive a wrench by means of which the support may be turned to move the packing rollers 154 to press the conveyor upwardly against the bottom of the crutcher plate, as shown in Figure 14 of the drawings. An eccentric clamp 155 is located in a recess extending crosswise of each of the cases at the periphery of the eccentric support therein, each clamp comprising a head to press against the eccentric and a shank projecting out of the recess to receive a nut to draw the clamp tightly into contact with the eccentric to hold it in place, as shown in Figure 15, of the drawings. Each eccentric is hollow to receive the shank 156 projecting from the back of a roller 154, which shank is suitably mounted in ball bearings of any ordinary construction, and as shown in Figure 14. A cap plate 157 is secured to each support 153 and a lubricating device 158 of any ordinary form and construction is attached to the cap plate as a means for introducing lubricant to the bearings for the shanks of the rollers within the supports.

The shanks of the supporting rollers 136 appurtenant to the cases 150 have their bearings supported directly against the inner walls of said cases, that is, the eccentric supports are omitted and the cases 150 are consequently smaller than the cases 149. A screw cap 159 closes the opening into each case 150 and a lubricating device is fixed to the cap, the same as that above described with respect to the cap plate 157. As the conveyor travels through the chambers the flanges 36 thereon travel in contact with the rollers just described, the back surfaces of the flanges traveling in contact with such rollers along the upper reach of the conveyor and the front surfaces of such flanges traveling in contact with the rollers along the lower reach of the conveyor. From this construction it will be noted that the rollers, although located within the tank, may be conveniently lubricated and with little trouble.

*Solidifying apparatus.*

After the molds have been filled with the material from the crutcher they are carried by the conveyor successively through the chambers in the tank, which chambers, in the most approved form of apparatus, are closed chambers, yet some of the features of the invention are capable of embodiment in connection with a frame that is not inclosed, and where the word "frame" is employed in the claims herein it is not necessarily to be understood as comprising in all instances an inclosed chamber. The material within the molds is subjected within the chambers in the tank to the action of a solidfying medium, and while various mediums may be employed for the purpose in hand, the following description will be with reference to brine as such medium, as brine is found to be especially useful for the purpose, soap material not dissolving under its action as it would under the action of water and some other elements and therefore wherever the term brine is used herein it will be understood as comprehending any solidifying agent that might be employed. Furthermore the density of the brine is made use of in the tanks at the bottom of the frame to retain the material within the molds as hereinafter described.

In the machine illustrated and described herein and in the use of which extremely satisfactory results have been obtained the brine is introduced to the chambers within the tank through pipes having nozzles that project the brine in a spray upon the upper and under surfaces of the upper reach of the conveyor, such brine, after having been sprayed against the conveyor, falling into the tanks 14 and 15 at the bottom of the frame from which tanks the brine is conducted through the pipes 16 and 17 to refrigerating apparatus of any approved sort, pumps being arranged in any satisfactory manner to cause a circulation of the brine from the tanks 14 and 15 through the pipes 16 and 17 to the refrigerating apparatus and back again to be delivered into chambers within the frame as will be hereinafter described. The pumps and refrigerating apparatus, comprising no part of the present invention, are not illustrated or further described herein, as their arrangement will be readily understood by those skilled in the art.

The soap material exposed at the open mouths of the molds when they enter the first chamber in the frame, is of soft consistency and would be pitted or roughened by direct contact with the brine, and means are, therefore, provided to subject the exposed material at the mouths of the molds to an indirect action of brine until such material becomes sufficiently hardened to effectively withstand such direct contact that takes place in an inner chamber.

In the use of my improved machine extremely satisfactory results have been obtained by reducing the material within the molds and hence the conveyor including such molds to a temperature that would not be of advantage when ejecting the cakes from the molds or when filling the molds with the hot material, and the outer chamber in the frame is, therefore, supplied with a solidifying medium, as brine, of a higher temperature than that supplied to the inner chamber, such medium being supplied to the outer chamber 12 through an inlet pipe 160 extending from the refrigerating apparatus and at a temperature of, say, 38° F., such medium being supplied to the inner chamber 13 through an inlet pipe 161 extending from the refrigerating apparatus and at a temperature of, say 18° F. these inlet pipes being shown in Figures 1 and 2 of the drawings. These pipes 160 and 161 each extend out through a flange at the bottom of the frame, then vertically for some distance, and then horizontally, sprayer pipes 162 being connected with the horizontal portions and extending laterally therefrom through the sides of the frame or tank underneath the upper reach of the conveyor and laterally thereof as shown in Figures 1, 2 and 5 of the drawing. These horizontally extending sprayer pipes are all of the same construction and are provided with nozzles constructed as hereinafter described. These pipes may be located at such distance apart as desired, this being largely a matter of expedience, a spacing sufficient to reach the entire under surface of the conveyor being found satisfactory.
The pipe 161 is extended above its horizontal part as at 163, and then laterally as at 164, through the side of the raised portion 8 of the tank (see Figures 1 and 2), over the top and laterally of the conveyor.
From the lateral extension 164 pipes 165, preferably two in number in the construction herein shown, extend lengthwise of the conveyor within the part 8, these pipes being provided with spray nozzles to be hereinafter described.

In order that the material exposed through the open mouths of the molds may be quickly solidified, as to its outer surface, so that it will be in condition to receive a direct application of the solidifying medium, an indirect application of such medium at a lower temperature, as hereinbefore referred to, is made by means of a baffle plate 166 located in the raised portion 8 of the tank, over the top of the upper reach of the conveyor, and in close proximity thereto, which baffle is supplied with a solidifying medium through a branch pipe 167 extending vertically from the horizontal portion of the pipe 161 and then horizontally outside of the raised portion 8 of the tank, (see Figures 1 and 2) and then laterally as at 168, through the side of the raised portion of the tank and laterally thereof near its front end over the baffle to supply the solidifying medium at the lower temperature on top of the baffle plate. One edge of this baffle is located over the chamber 13 and the brine flows along the baffle and over its edge onto the conveyor over the chamber 13, and from the conveyor it drops into the tank 15.

The horizontal sprayer pipes 162 are provided with spray openings 169 arranged at such intervals along the pipes as may be desired, these intervals depending largely upon expediency influenced by pressure, size of openings, shape of parts etc. It may be generally stated that an arrangement whereby the whole upper surface of the conveyor will be covered by the solidifying medium will be satisfactory. A spreader 170 is located at one edge of each of the openings 169, each spreader having a curved directing surface 171 terminating in a spraying lip 172, these spreaders in the form herein shown and when viewed in a direction lengthwise of the pipe being substantially in the shape of a quadrant. Each spreader has an attaching plate 173 by means of which it is secured, as with screws, to the side of the sprayer pipe with its spreader projecting into the spray opening therein.

A spray opening sizing sleeve 174 surrounds each sprayer pipe with an opening 175 appurtenant to each nozzle, the attaching plates 173 being located within said openings. One edge of each opening 175 is located opposite a directing surface 171, and each sleeve is provided with means for varying the position of said opening with respect to said surface. In the structure herein shown a filling piece 176 in the end of each sleeve receives a spindle 177 to which is splined a hand wheel 178 having a hub resting against the filling piece. The spindle 177 is threaded into a plug 179 secured in the end of a pipe 162, a spring 180 thrusting with one end against said plug and with its opposite end against said filling piece holding the edge of the openings 175 in proper positions with respect to the directing surfaces 171. By turning the hand wheels 178 the sizes of these openings may be varied to suit conditions. The construction permits the hand wheel to be moved lengthwise of the spindle but it can not turn independently of it, and a head at the end of the spindle, as shown in dotted lines in Figure 10, will prevent the hand wheel from being forced off from the spindle. This arrangement provides a means whereby pressure upon the hand wheel will force the sleeve 174 in a direction to enlarge the spray openings for the purpose of removing any material that may have lodged within an opening, and when such pressure is released the spring 180 will return the parts to their normal positions. The pipes 162 are preferably extended so that the wheels 178 will be located outside of the case.

The pipes 165 are provided with lateral branches 181 located at suitable intervals to secure the desired results, such spacing depending upon conditions as hereinbefore mentioned with respect to other sprayers, pipes, etc. Each branch is provided with a spraying nozzle 182 opening downwardly, as shown in Figure 12. A spreader 183 is located within the open end of the nozzle, this spreader having a curved directing surface 184 terminating in a spraying lip 185. A spreader spindle 186 is secured to the spreader and extends therefrom through a releasing sleeve 187 located within the nozzle and projecting out at its end opposite the spreader, said sleeve having a flange 188 resting upon a spring 189, said spring being seated at one end upon a shoulder in the nozzle and thrusting with its opposite end against said flange. The flange 188 is pressed against a screw cap 190 closing this end of the nozzle. In the structure herein shown the releasing sleeve 187 is formed in two sections, the end of the section 191 being in contact with an adjusting nut 192 secured upon a screw threaded portion of the spindle 186. A lock nut 193 may be employed to hold the parts in their adjusted positions.

From the above description it will be noted that a rotation of the adjusting nuts 192 will vary the positions of the spreaders with respect to the openings in the nozzles whereby the form of the sprays may be changed. Furthermore a downward pressure upon the spindles 186 will move the spindles and the sleeves 187 against the tension of the springs 189 thereby moving the spreaders to increase the size of the openings in the nozzles for the purpose of removing any material that may have lodged in said openings.

In order to effect this latter movement I have provided means for simultaneously operating a number of spindles at a single operation, this means consisting of releasing shaft came 194 secured to a releasing shaft 195 rotatably supported in brackets 196 secured to the top of the raised portion 8 of the tank, there being a cam appurtenant to each of the spindles 186 and a shaft 195 appurtenant to each row of nozzles extending lengthwise of the conveyor. The sleeve section 191 extends through the top of the raised portion 8 of the tank so that the relieving and adjusting means are located on top and outside of the machine, as shown in Figures 1, 2, 12 and 13 of the drawings. Each of the shafts 195 may be provided with a crank handle 197 by means of which the shafts may be turned to operate the spindles 186, and which spindles will be returned by the springs 189 to their normal positions when preesure upon the handles is released. The nozzles 182 on one pipe 165 are preferably staggered with respect to those on the other pipe 162, and hence one of said pipes, as well as one of the shafts 195, may be shorter than the other of said pipes or shafts.

*Cake removing apparatus.*

The discharging conveyor 119 may be of any suitable construction supported upon sprocket wheels 198 in any suitable manner and driven as may be found most expedient. This conveyor may comprise two chains spaced apart a distance at least equal to the length of the mold plates, said chains supporting between them the receivers 118 that are pivotally attached to the chains and depending therefrom. Each receiver is of such length that it will receive all of the cakes of soap discharged from one row of molds in a mold plate, the movement of this conveyor 119 being so timed that a receiver will be moved opposite each row of molds as they pass the ejecting point. The receivers 118 are open on that side into which the cakes are moved when ejected from the molds and the other sides of the receivers are provided with openings or slots. In the structure herein shown the back and bottom of each receiver is slotted at intervals providing angularly formed fingers 199 so arranged that each cake will be supported by a plurality of such fingers, and the fingers are preferably ribbed (not shown) on the surfaces against which the cakes rest so that water projected as from a washing nozzle or nozzles 201 onto the cakes to remove the brine therefrom as hereinbefore described may gain free access to all sides and substantially all parts of the cakes. In order to present the receivers in proper position to receive the cakes from the molds a supporting shoe or a set of supporting shoes 200 is or are secured to any suitable stationary support between the sprocket wheels to position the receivers with their open sides squarely opposite the molds at the point of ejection of the cakes from the latter, and as shown in Figure 5 of the drawings.

By preference the mold conveyor travels slightly faster than the discharge conveyor with a result that while the cakes are projected squarely into the openings in the receivers 118 such faster movement of the mold conveyor will carry the cakes against the sides of the receivers with a result that should the cakes for any reason stick to the followers they will be swept therefrom and caused to fall into the receivers.

*Operation.*

Briefly described, in the operation of the machine the material to be hardened is forced from the bottom of the crutcher by the positive feed devices in definite amounts to the molds, the followers in which are operated to attain certain results as hereinbefore described. From the crutcher the molds pass underneath the baffle plate 166 in the raised portion 8 of the tank and over the chamber 12 where the exposed material in the mouths of the molds is indirectly subjected to the action of the colder solidifying medium hereinbefore referred to. During this time the under surface of the conveyor and the molds depending therefrom are sprayed with the warmer solidifying medium hereinbefore mentioned, the conveyor protecting the baffle from contact to any appreciable extent with said warmer medium.

In the continued movement of the conveyor the exposed faces of the material in the mouths of the molds pass from under the baffle plate and the molds depending from the conveyor pass from the chamber 12 into the chamber 13. The now exposed faces of the material, having been sufficiently hardened by the action of the baffle, are exposed to the direct action of the colder solidifying medium from the nozzles 182, which medium at the same temperature is also projected against the under surface of the conveyor and the molds projecting therefrom in the chamber 13. In this chamber the conveyor passes around the supporting wheels 21 into the tank 15 in the bottom of the frame, the molds being inverted in this tank and the solidifying medium being of a depth to substantially cover this reach of the conveyor and the molds projecting therefrom. The density of said medium prevents the cakes from falling out of the molds while thus inverted.

Should operations with respect to material within the molds take place when the conveyor is reduced to the lowest temperature, as when moved from the inner chamber, undesirable results would follow, as the cakes would be liable to stick to the molds, thus obstructing ejection of the cakes therefrom and producing cakes with rough surfaces. Further than this the conveyor coming from the colder chamber into the warmer atmosphere would be covered with frost, and the temperature of the conveyor and molds when passed underneath the crutcher would be such as to produce objectionable results when the hot soap is forced into the molds.

Therefore, to avoid these objectionable results the chamber 12 supplied with the warmer solidifying medium is provided into which the conveyor is passed before it emerges at the open end of the tank. In this chamber 12 economy in the utilization of the heat from the material within the molds and in the lessening of the demands upon refrigeration is practiced. The solidifying medium sprayed against the under surface of the upper reach of the conveyor absorbs therefrom heat to a certain extent and the heat from the material within the molds is thereby transferred, as the medium falls into the tank 14, to the lower reach of the conveyor as it passes out from the colder chamber 13 that absorbs such heat, this reach of the conveyor at this end being, therefore, raised in temperature so that the cakes of soap may be freely ejected from the molds by the ejectors hereinbefore described, such cakes being consequently smooth and the conveyor being in proper condition to again receive hot material from the crutcher.

It is necessary to maintain the temperature of the solidifying medium within both of the chambers 12 and 13, this being done by the refrigerating apparatus hereinbefore referred to but not illustrated in the drawings herein. The amount of refrigeration required for the medium in the chamber 12 is lessened by subjecting such medium, as it falls from the upper reach of the conveyor in the chamber 12, in a warmed condition to the action of the cold conveyor traveling from the colder chamber, such medium being cooled by the absorption of heat therefrom by the conveyor, thus lowering its temperature and requiring less refrigeration than would otherwise be required.

In this way the heat from the heated soap material is not permitted to escape from the chamber 12 but is utilized to warm the conveyor to the necessary degree, and likewise the cold conveyor traveling into the warmer chamber is promptly made use of to reduce the temperature of the solidifying medium as just described, thus reducing the amount of refrigeration required for it.

It will thus be noted that the heat is retained within the interior of the mass of material, the outer surface only being cooled within the chamber, the excessive cold or absence of heat at the outside of each mass subsequently, and during the drying operation, absorbing the heat of the hot material within the interior of each mass and transferring it outwardly to be carried away with the air within the dryer whereby moisture collecting on the exterior of the mass is absorbed and carried away by the air currents and the mass is thereby properly dried, making it suitable for operation thereon by the stamping machine. This comprises a process that forms the subject matter of an application filed by me January 20, 1921, of Serial Number 438,677, which has become Patent 1,401,050, which process is, therefore, not claimed herein, and it is mentioned that the hardening process may be aided by subjecting the cakes of soap as they pass from the machine herein described to the action of water by means of which the brine is removed from the surfaces of the cakes as hereinbefore described.

In accordance with the provisions of the patent statutes I have described the principles of operation of my invention, together with the apparatus which I now consider to represent the best embodiment thereof; but I desire to have it understood that the apparatus shown is only illustrative, and that the invention may be carried out by other means.

I claim—

1. A material solidifying machine including a frame having an inclosed solidifying chamber therein, a conveyor movably mounted in said chamber and comprising molds each depending from one face of the conveyor and spaced from other molds on opposite sides thereof, and means for subjecting material within said molds to the action of an artificially created hardening medium on all sides.

2. A material solidifying machine including a suporting frame, a conveyor movably mounted in said frame and comprising molds projecting from one face of the conveyor and having open mouths on the opposite face thereof, means for subjecting the molds on all sides to the action of a freely circulated artificially created hardening medium having certain temperature characteristics, and means for subjecting the exposed parts of the material in the open mouths of the molds to the action of an artificially created hardening medium having different temperature characteristics.

3. A material solidifying machine including a supporting frame, a conveyor movably mounted in said frame and comprising molds projecting from one face of the conveyor and having open mouths on the opposite face thereof, means for subjecting the molds on all sides to the action of a freely circulated artificially created hardening medium from one source of supply, and means for subjecting the exposed parts of the material in the open mouths of the molds to the action of an artificially created hardening medium from another source of supply.

4. A material solidifying machine including a frame having an inclosed solidifying chamber therein, a conveyor movably mounted in said chamber and comprising molds projecting from one face of the conveyor and having open mouths on the opposite face of said conveyor, means for subjecting the molds on all sides to the action of an artificially created hardening medium having certain temperature characteristics, and means for subjecting the exposed parts of the material in the exposed mouths of the molds to the action of an artificially created hardening medium having different temperature characteristics.

5. A material solidifying machine including a frame having a plurality of inclosed chambers, a conveyor movably mounted to travel successively through said chambers and comprising molds projecting from one face of the conveyor, and means for subjecting material within the molds to the action of an artificially created hardening medium within said successive chambers.

6. A material solidifying machine including a frame having a plurality of inclosed chambers therein, a conveyor movably mounted to travel successively through said chambers and comprising molds projecting from one face of the conveyor, and means whereby the creation of solidifying temperatures of different characters is effected in said chambers.

7. A material solidifying machine including a frame having a plurality of inclosed chambers therein, a conveyor movably mounted in said chambers and comprising molds projecting from one face of the conveyor, and means for projecting a solidifying medium upon opposite sides of the conveyor.

8. A material solidifying machine including a frame having an inclosed solidifying chamber therein, a conveyor movably mounted in said chamber at the top and bottom thereof and comprising molds projecting from one face of the conveyor, means for supplying a solidifying medium to the upper reach of the conveyor, and a tank in the bottom of the frame to receive said solidifying medium and of a depth to effect submersion of the lower reach of the conveyor within said medium.

9. A material solidifying machine including a frame having an inclosed solidifying chamber therein, a conveyor movably mounted in said chamber and comprising molds within its bounds, and means for projecting a hardening medium against the upper reach of the conveyor for action on material in said molds whereby said medium will fall on to the lower reach of the conveyor for repeated action on the mold structures.

10. A material solidifying machine including a frame having a plurality of inclosed solidifying chambers therein, a conveyor movably mounted in said chambers with reaches at the top and bottom thereof and comprising molds within its structure, means for subjecting material within the molds in one chamber to the action of a solidifying medium, and means for projecting a solidifying medium against the upper reach of the conveyor in another chamber for action on material in said molds whereby said medium will fall on to the lower reach of the conveyor for repeated action on the mold structures.

11. A material solidifying machine including a frame having a plurality of inclosed solidifying chambers therein, a conveyor movably mounted in said chamber and comprising molds within its structure, means for subjecting material within the molds in one chamber to the action of a solidifying medium from one source of supply to permit the use of such medium at a certain temperature, and means for projecting a solidifying medium from another source of supply and of a different temperature against the upper reach of the conveyor in another chamber whereby said medium falls to the lower reach of the conveyor to transfer its temperature to the conveyor and molds traveling from the chamber first mentioned.

12. A material solidifying machine including a frame having inner and outer solidifying chambers therein, a conveyor movably mounted in said chambers and comprising molds within its structure, means for subjecting material within the molds in the inner chamber to the action of a solidifying medium from one source and of a certain temperature, means for supplying a solidifying medium from another source and of a higher temperature to the upper reach of the conveyor in the outer chamber whereby said material falls to the lower reach of the conveyor for repeated action on the mold structure and to transfer its temperature to the conveyor traveling from the inner chamber.

13. A material solidifying machine including a frame, a conveyor mounted in said frame and comprising molds with upwardly opening mouths, a baffle overlying the conveyor in proximity to the mouths of the molds, means for freely circulating a solidifying medium against the under side of the conveyor, and means for supplying a solidifying medium on the upper side of said baffle.

14. A material solidifying machine including a frame, a conveyor mounted in said frame and comprising molds with upwardly opening mouths, a baffle overlying a part of the conveyor in proximity to the mouths of the molds, means for supplying a solidifying medium on to said baffle, and means for directing solidifying medium to the upper surface of the conveyor and material carried thereby beyond said baffle.

15. A material solidifying machine including a frame, a conveyor mounted in said frame and comprising molds with upwardly opening mouths, a baffle overlying a part of the conveyor in proximity to the mouths of the molds, means for supplying a solidifying medium against the under side of the conveyor, means for supplying a solidifying medium on to the baffle, and means for supplying a solidifying medium to the upper side of the conveyor beyond said baffle.

16. A material solidifying machine including a frame having a crosswise partition, a conveyor movable across said partition from one to the other side thereof and comprising molds with upwardly opening mouths, a baffle located over the conveyor on one side of the partition and having its discharge edge located on the other side of said partition, means for supplying a solidifying medium to the under side of the conveyor, and means for supplying a solidifying medium on to said baffle.

17. A material solidifying machine including a frame having a crosswise partition, a conveyor movable across said partition from one to the other side thereof and comprising molds with upwardly opening mouths, a baffle located over the conveyor on one side of the partition, means for supplying a solidifying medium to the conveyor on one side of the partition, separate and disconnected means for supplying a solidifying medium to the conveyor on the opposite side of said partition, and means for supplying a solidifying medium to said baffle.

18. A material solidifying machine including a frame having a crosswise partition, a conveyor movable across said partition from one to the other side thereof and comprising molds with upwardly projecting mouths, a baffle located over the conveyor on one side of the partition, means for supplying a solidifying medium to the conveyor on one side of said partition, and means comprising one source for supplying a solidifying medium to the conveyor on the opposite side of said partition and to said baffle.

19. A material solidifying machine including a frame having a crosswise partition, a conveyor movable across said partition from one to the other side thereof and comprising molds with upwardly opening mouths, a baffle located over the conveyor on one side of the partition and having its discharge edge located on the other side of said partition, means for supplying a solidifying medium from one source to the conveyor on one side of the partition, and means for supplying a solidifying medium from another source above the conveyor on the opposite side of said partition and to said baffle.

20. A material solidifying machine including a frame having a crosswise partition, a conveyor movable across said partition from one to the other side thereof and comprising molds with upwardly opening mouths, a baffle located over the conveyor, means for supplying a solidifying medium to the conveyor on one side of the partition, means for supplying a solidifying medium to the conveyor on the other side of said partition, and means for supplying a solidifying medium on said baffle.

21. A material solidifying machine including a frame having a crosswise partition, a conveyor movable across said partition from one to the other side thereof and comprising molds with upwardly opening mouths, a baffle located over the conveyor, means for supplying a solidifying medium from one source to the conveyor on one side of the partition, and means for supplying a solidifying medium from another source both to the conveyor on the other side of said partition and to the baffle.

22. A material solidifying machine including a frame having a crosswise partition, a conveyor movable across said partition from one to the other side thereof and comprising molds with upwardly opening mouths, a baffle located over the conveyor, means for supplying a solidifying medium to the conveyor from one source on one side of the partition, and means for supplying a solidifying medium from another source to the conveyor on the other side of said partition, to the baffle, and to the upper side of the conveyor outside of said baffle.

23. A material solidifying machine including a frame having a crosswise partition, a conveyor movable across said partition from one to the other side thereof and comprising molds with upwardly opening mouths, a baffle located over the conveyor on one side of the partition and having its discharge edge located on the other side of said partition, means for supplying a solidifying medium to the conveyor on one side of the partition, separate and disconnected means for supplying a solidifying medium to the conveyor on the opposite side of said partition, and means for supplying a solidifying medium to said baffle.

24. A material solidifying machine including a frame having a crosswise partition, a conveyor movable across said partition from one to the other side thereof and comprising molds with upwardly projecting mouths, a baffle located over the conveyor on one side of the partition and having its discharge edge located on the other side of said partition, means for supplying a solidifying medium to the conveyor on one side of said partition, and means comprising one source for supplying a solidifying medium to the conveyor on the opposite side of said partition and to said baffle.

25. A material solidifying machine including a frame, a conveyor movably mounted on the frame and comprising molds projecting from one face of the conveyor, means for projecting a solidifying medium against the conveyor, and a tank in the bottom of the frame to receive said medium as it falls from the conveyor, said tank also receiving the lower reach of said chain.

26. A material solidifying machine including a frame, a conveyor having upper and lower reaches movably mounted in the frame and comprising molds within its structure, means for projecting a solidifying medium against the upper reach of the conveyor for action on material in said molds whereby said medium will fall on to the lower reach of the conveyor for repeated action on said conveyor, and means for conveying the said medium away from the frame after action on the lower reach of the conveyor.

27. A material solidifying machine including a frame, a conveyor having upper and lower reaches movably mounted in said frame and comprising molds within its structure, means for subjecting material within the molds at one part of the conveyor to the action of a solidifying medium, and means for projecting a solidifying medium at another part of the conveyor and against the upper reach thereof for action on material in said molds whereby said medium will fall on to the lower reach of the conveyor for repeated action thereon.

28. A material solidifying machine including a frame, a conveyor having upper and lower reaches movably mounted in said frame and comprising molds within its structure, means for subjecting material within the molds at one part of the conveyor to the action of a solidifying medium from one source of supply, and means for projecting a solidifying medium from another source of supply against another part of the conveyor and the upper reach thereof whereby said medium falls to the lower reach of the conveyor to transfer to it temperature received from the upper reach of the conveyor.

29. A material solidifying machine including a frame comprising an inclosed chamber, a mold conveyor movably mounted on the frame and dividing said chamber into upper and lower compartments, means for permitting the introduction of a solidifying medium of one character into the upper compartment and against the conveyor therein, means for effecting the introduction of a solidifying medium of another character into the lower compartment and against the upper reach of the conveyor, said conveyor preventing the influence of the medium in one of said compartments from exerting appreciable harmful effects upon the medium in the other of said compartments.

30. A material solidifying machine including a frame, a mold conveyor movably mounted on the frame, pipes located above the upper reach of the conveyor and having nozzles for spraying a solidifying medium on the upper reach of the conveyor, and pipes located underneath the upper reach of the conveyor and having spraying nozzles for spraying a solidifying medium against the under surface of the upper reach of the conveyor.

31. A material solidifying machine including a frame, a partition dividing one part of said frame from another part thereof, a mold conveyor movably mounted on the frame and across said partition, a pipe having nozzles connected with one source of supply and located to spray a solidifying medium against the conveyor on one side of the partition, and a pipe connected with another source of supply and provided with nozzles for projecting a spray upon the under side of the conveyor on the other side of said partition.

32. A material solidifying machine including a frame, a mold conveyor movably mounted on the frame, a partition dividing one part of said frame from another part thereof, a pipe connected with one source of supply and located to supply a solidifying medium above the upper reach of the conveyor at one side of the partition, and a pipe connected with another source of supply and located to supply a solidifying medium against the under side of the conveyor on the same side of said partition.

33. A material solidifying machine including a frame, a mold conveyor movably mounted on the frame, followers located in said molds, a device for the supply of material to said molds, means for maintaining the followers in fixed positions in the molds just after filling, and means for withdrawing the followers to relieve pressure after filling of the molds from said supply device.

34. A material solidifying machine including a frame, a mold conveyor movably mounted on the frame, followers located in said molds, a device for the supply of material to said molds, and means for moving the followers to impart a convex surface to the material at the mouths of the molds after passing said supply device.

35. A material solidifying machine comprising a frame, conveyor supporting wheels with means for driving them mounted in said frame, a conveyor comprising mold members with knuckles projecting toward an adjoining mold member, a tubular pivot extending through the knuckles at adjoining edges of said mold members, said pivot having ports located within the openings in said knuckles, and means for closing the openings at the ends of said tubular pivot.

36. A material solidifying machine conveyor comprising a plurality of mold plate frames pivotally united and having openings, mold plates secured to said frames and having molds projecting through said openings, wheels for supporting said conveyor, and means for driving said wheels.

37. A material solidifying machine conveyor comprising a plurality of mold plate frames pivotally united and having openings, mold plates having flanges with grooves in their under surfaces to receive bounding edges of said openings, said mold plates having molds extending through said openings, means for securing the mold plates to said frames, means for pivotally connecting said frames, and conveyor supporting wheels with means for driving them.

38. A material solidifying machine conveyor comprising a plurality of mold plate frames pivotally united and having openings with webs bounding opposite sides thereof, mold plates secured to said frames and having molds projecting through said openings, said frames having openings from the front to the back face thereof, conveyor supporting wheels, and means for driving said wheels.

39. A material solidifying machine conveyor comprising a plurality of mold plate frames pivotally united and having openings, webs bounding said openings and having grooves and depressions within said grooves, mold plates having molds projecting through said openings, and lips located in said grooves, means for securing the mold plates to said frames with said lips separated to provide a space registering with said depressions to create openings extending from the front to the back of said mold plate structure, and conveyor supporting wheels with means for driving them.

40. A material solidifying machine comprising a frame, supporting wheels mounted in said frame, a mold conveyor carried by said wheels and comprising mold members pivotally connected at their edges and having molds depending from their back surfaces, supporting flanges located at the ends of said mold members and extending lengthwise of the conveyor, said flanges creating shoulders thereunder, and supporting rollers mounted in the frame opposite said shoulders and to receive said flanges.

41. A material solidifying machine comprising a frame, supporting wheels mounted in said frame, a mold conveyor carried by said wheels, cases for bearing rollers supported at intervals on the frame between said supporting wheels, and rollers having spindles projecting into said cases, said rollers being located to support said conveyor at its opposite edges.

42. A material solidifying machine comprising a frame, supporting wheels mounted in said frame, a mold conveyor carried by said wheels, cases having bearing rollers projecting through the sides of the frame with their ends located on opposite sides thereof, and rollers located at the inner ends of the cases and having spindles rotatably mounted in said cases and projecting to the outer ends thereof, said rollers being located to support the conveyor at its opposite edges.

43. A material solidifying machine comprising a frame, a material supply device mounted on the frame, supporting wheels mounted in the frame, a mold conveyor carried by said wheels, cases for bearing rollers supported at intervals along said frame and underneath said supply device, and means for adjusting the position of the rollers underneath said supply device and with respect thereto.

44. A material solidifying machine comprising a frame, a material supply device mounted on the frame, supporting wheels mounted in the frame, a mold conveyor carried by said wheels, cases for bearing rollers supported at intervals along said frame and underneath said supply device, eccentric supports rotatably mounted in cases underneath said supply device, and rollers having spindles located in said supports, said rollers being positioned to support said conveyor.

45. A material solidifying machine including a frame, a conveyor containing molds movably mounted on the frame, followers movably located in said molds, a supporting member adjustably movably mounted, a second supporting member carried by the first member and adjustably movable independently thereof, and follower operating members carried by said supporting members.

46. A material solidifying machine including a frame, a conveyor containing molds movably mounted on the frame, followers movably located in said molds, a supporting member adjustably movably mounted, a plurality of supporting members carried by the first member and adjustably movable independently thereof and independently each of another, and follower operating members carried by said supporting members.

47. A material solidifying machine including a movably mounted conveyor comprising molds, followers located in said molds, a device for the supply of material to said molds, a stationary track member, and a filling track member sloping downwardly from said stationary member, said track members being arranged to be operatively connected with said followers to position them for the admission of material from said supply device and to retract the followers as the molds are being filled.

48. A material solidifying machine including a movably mounted conveyor comprising molds, followers located in said molds, a device for the supply of material to said molds, a filling track member sloping downwardly, and a relieving track member adjustably movably mounted with respect to said filling track member, said track members being arranged for operative connection with said followers to retract them as the molds are being filled and to again retract them for relief of pressure therein.

49. A material solidifying machine including a movably mounted conveyor comprising molds, followers located in said molds, a device for the supply of material to said molds, a filling track member sloping downwardly, and a relieving track member adjustably movably mounted with respect to said filling track member, said track members being positioned for connection with said followers to retract them for filling and for relief of pressure during the filling operation of the molds.

50. A material solidifying machine including a movably mounted conveyor comprising molds, followers located in said molds, a device for the supply of material to said molds, a stationary track member, a filling track member sloping downwardly from said stationary member, and a relieving track member located appurtenant to said filling track member, said track members being positioned for connection with said followers to position them for filling, to retract them during filling, and to retract them for relief of pressure therein.

51. A material solidifying machine including a movably mounted conveyor comprising molds, followers located in said molds, a device for the supply of material to said molds, a stationary track member, a filling track member pivotally attached to said stationary member, said track members being arranged for connection with said followers to position them for filling and to retract them during the filling operation, and means for adjustably moving said filling track member.

52. A material solidifying machine including a movably mounted conveyor comprising molds, followers located in said molds, a device for the supply of material to said molds, a filling track member sloping downwardly, means for adjustably positioning said track member, a relieving track member movably mounted with respect to said filling track member, and means for adjustably moving said relieving track member, said track members being positioned for connection with said followers to retract them for the filling operation and for relief of pressure after such filling.

53. A material solidifying machine including a movably mounted conveyor comprising molds, followers located in said molds, a device for the supply of material to said molds, stems projecting from said followers, a stationary track member, a filling track member mounted to be adjustably moved with respect to said stationary track member, said track members having registering grooves to receive projections from said stems to move the followers during the filling of the molds from said supply device.

54. A material solidifying machine including a movably mounted conveyor comprising molds, followers located in said molds, a device for the supply of material to said molds, a stationary track member, a beam, means for adjustably moving said beam, and a filling track member attached to said beam and sloping downwardly thereto, said track members being positioned for connection with said followers to operate them during the filling operation.

55. A material solidifying machine including a movably mounted conveyor comprising molds, followers located in said molds, a device for the supply of material to said molds, a filling track member sloping downwardly, a filling track beam to which said track member is attached, means for adjustably moving said beam, a relieving track beam supported by said filling track beam, means for adjustably moving the relieving track beam independently of the filling track beam, and a relieving track member mounted on said relieving track beam, said track members being positioned for connection with said followers to impart different movements thereto during the filling operation.

56. A material solidifying machine including a movably mounted conveyor comprising molds, followers located in said molds, a device for the supply of material to said molds, a relieving track member positioned for connection with said followers to impart movement thereto to relieve pressure for filling of the molds, means for adjustably moving said track member, a convexing member rigidly supported by said relieving track member, and means for adjustably moving said convexing member independently of the relieving track member.

57. A material solidifying machine including a movably mounted conveyor comprising molds, followers located in said molds, a device for the supply of material to said molds, a filling track beam, a filling track member supported thereby and sloping downwardly, a relieving track beam supported by said filling track beam, means for adjustably moving said relieving track beam independently of the filling track beam, a relieving track member supported by the relieving track beam, a convexing member supported by the relieving track beam, and means for adjustably moving said convexing member independently of the relieving track beam.

58. A material solidifying machine including a movably mounted conveyor comprising molds, followers located in said molds, a device for the supply of material to said molds, a filling track beam, a filling track member supported by said beam and sloping downwardly, means for adjustably moving said filling track beam, a relieving track beam supported by said filling track beam, means for adjustably moving the relieving track beam independently of the filling track beam, a relieving track member supported on said relieving track beam, a convexing member supported by said relieving track beam, and means for adjustably moving the convexing member independently of said relieving track beam, all of said members being positioned for connection with said followers to operate them during the filling operation.

59. A material solidifying machine including a movably mounted conveyor comprising molds, followers located in said molds, a device for the supply of material to said molds, a stationary track member, a filling track member pivotally connected with said stationary member, a filling track beam to support said filling track member, means for adjustably moving said filling track beam, a relieving track member movably mounted with respect to the filling track member, a relieving track beam supporting said relieving track member, means for adjustably moving said relieving track beam, all of said track members being positioned for connection with said followers to operate them during the filling operation, and a convexing member positioned for connection with said followers after operation thereon by said track members.

60. A material solidifying machine including a movably mounted conveyor comprising molds, followers located in said molds, a device for the supply of material to said molds, a track member positioned for connection with said followers to operate them, a follower operating member eccentrically mounted for adjustment of its position with respect to said followers, and means for adjustably rotating said eccentric member for said adjustment.

61. A material solidifying machine including a frame, a conveyor containing molds movably mounted in the frame, followers located in said molds, an ejecting member movably mounted to operate the followers to eject cakes of material from said molds, and means for imparting a gradual accelerated ejecting movement to said ejecting member.

62. A material solidifying machine including a frame, a conveyor containing molds movably mounted in the frame, followers located in said molds, an ejecting member movably mounted to operate the followers to eject cakes of material from said molds, and means for imparting a slow movement to said ejecting member at the beginning of the ejecting operation and to gradually increase its rate of movement during such ejecting operation.

63. A material solidifying machine including a movably mounted conveyor comprising molds, followers located in said molds, a device for the supply of material to said molds, an ejecting shoe movably positioned to receive a sweeping action of said followers that are thereby operated to eject cakes from said molds, and means for moving said shoes to operate said followers.

64. A material solidifying machine including a movably mounted conveyor comprising molds, followers located in said molds, a device for the supply of material to said molds, a pair of intermeshing eccentrically mounted gears, means for rotating said gears, and an ejecting shoe operatively connected with one of said gears and positioned with respect to said followers to operate them to eject cakes from said molds.

65. A material solidifying machine including a movably mounted conveyor comprising molds, followers located in the molds, a device for the supply of material to said molds, a pair of intermeshing eccentrically mounted gears, means for operating said gears, an ejecting eccentric mounted for operation by one of said gears, and an ejecting shoe mounted on said ejecting eccentric and positioned with respect to said followers to operate them to eject cakes from said molds.

66. A material solidifying machine including a frame, a conveyor containing molds movably mounted on the frame, followers located in said molds, means for operating the followers to eject cakes of formed material from the molds, a rotatably mounted wheel located appurtenant to the conveyor, fingers projecting from the periphery of said wheel to enter the mouths of the molds and push the followers backwardly therefrom, and means for rotating said wheel.

67. A material solidifying machine including a frame, a conveyor containing molds movably mounted on the frame, a device for supplying material to said molds, a feeding member movably mounted and provided with pockets to carry material from said supply device to feed said molds, and means for resiliently retaining material in said pockets.

68. A material solidifying machine including a frame, a conveyor containing molds movably mounted on the frame, a device to supply material to said molds, a feeding member rotatably mounted and having peripheral teeth forming pockets to carry material from said supply device to feed said molds, and means for resiliently retaining material in said pockets.

69. A material solidifying machine including a frame, a conveyor containing molds movably mounted on the frame, a device for supplying material to said molds, a rotatably mounted toothed member comprising pockets in the spaces between its teeth for feeding material from said supply device to said molds, and yieldingly mounted means to retain material in said pockets.

70. A material solidifying machine including a frame, a conveyor containing molds movably mounted in the frame, a device for supplying material to said molds, a pair of rotatably mounted toothed members for supplying material from said supply device to said molds, the spaces between said teeth constituting pockets, movably mounted bearings for supporting one of said members, and means for rotating said feed members.

71. A material solidifying machine including a frame, a conveyor containing molds movably mounted in the frame, a device for supplying material to said molds, a pair of rotatably mounted toothed feed members for supplying material from said supply device to said molds, the spaces between said teeth constituting pockets, movably mounted bearings for supporting one of said feed members, a yieldingly mounted wall to retain material in said pockets, and means for rotating said feed members.

72. A material solidifying machine including a frame, a conveyor having molds arranged in sets extending lengthwise thereof with the molds of each set extending crosswise of the conveyor, a device for supplying material to said molds, compartments in the bottom of said supply device to overlie each of the molds in each of said sets, a pair of toothed feed wheels located in each compartment and having intermeshing teeth forming pockets, a shaft extending through said compartments and having a member of each pair of wheels secured thereto, and means for rotating said shaft.

73. A material solidifying machine including a frame, a conveyor mounted in the frame and having molds spaced at regular intervals therealong, a device for supplying material to said molds, a feeding member having pockets to receive material from said device to feed it to said molds, and means for imparting an intermittent feed movement to said feed member.

74. A material solidifying machine including a frame, a conveyor mounted in the frame and having molds spaced at regular intervals therealong, a device for supplying material to said molds, positive driving means for said conveyor, a feed member to receive material from said device to feed it to said molds, and positive driving means for imparting intermittent feed movement to said feed member, all of said driving means being timed in their movements relatively one to the other by operation from a single member.

75. A material solidifying machine including a frame, a supply device mounted on the frame, a feed case located underneath said supply device and having a compartment therein, a feed member located in said compartment, and a conveyor mounted on the frame to move underneath said compartment and having molds to receive material passed through said compartment.

76. A material solidifying machine including a frame, a supply device mounted on the frame, a case located underneath said supply device and having a compartment therein, a feeding member located in said compartment, a plate located underneath said feed case and having a supply chamber therein to receive material from said supply device, and a conveyor mounted on the frame to move underneath said supply chamber and having molds to receive material from said chamber.

77. A material solidifying machine including a frame, a supply device mounted on the frame, a conveyor mounted on the frame and having molds to receive material from said supply device, a plate member located between said supply device and said conveyor and having a chamber to receive material from said supply device, and a yieldingly mounted packing plate located at the edge of the mouth of said compartment to pack the joint thereat.

78. A material solidifying machine including a frame, a supply device mounted on the frame, a conveyor mounted on the frame and having molds to receive material from said supply device, a plate member located between said supply device and said conveyor and having a chamber to receive material from said supply device, and a yieldingly mounted packing plate surrounding the mouth of said compartment to pack the joint thereat and having a flange extending into said compartment and forming the walls thereof.

79. A material solidifying machine including a frame, a supply device mounted on said frame, a conveyor mounted on said frame and having molds to receive material from said supply device, a rotatably mounted feed member to feed material from said supply device to said molds, a member with means for imparting oscillatory movement thereto, and a connection between said feed member and said oscillatory member to impart feeding movement to the feed member by movement of said oscillatory member in one direction only.

80. A material solidifying machine including a frame, a supply device mounted on the frame, a conveyor movably mounted on the frame and having molds to receive material from said supply device, a rotatably mounted feed member for the supply of material from said supply device to said molds, a pair of oscillatory members, means for operating said oscillatory members alternately in opposite directions, and a connection between said feed members and said oscillatory members to impart feeding movement to the feed members by movement of each oscillatory member in one direction only.

81. A material solidifying machine including a frame, a supply device mounted on the frame, a conveyor mounted on the frame and having molds to receive material from said supply device, a rotatably mounted feed member to supply material from said supply device to said molds, a pair of oscillatory driving members, a ratchet and pawl connection between said feed member and said driving members for imparting movement to the feed member by movement of said driving members in one direction only, a pair of oscillatory actuating members operatively connected with each of said driving members, and means for imparting oscillating movement to each of said actuating members alternately in opposite directions.

82. A material solidifying machine including a frame, a receiving conveyor mounted on said frame and having molds, means for supplying material to said molds, a discharging conveyor having receivers movably mounted to receive individual cakes of molded material from the receiving conveyor during its movement, means for ejecting cakes of molded material from said receivers, and means for projecting a washing liquid on to said cakes of material in said receivers.

83. A material solidifying machine including a frame, a material supply device mounted on the frame, a receiving conveyor movably mounted in the frame and having molds to receive said material, means for ejecting material from said molds, a discharging conveyor, receivers carried by said discharging conveyor in proximity to said receiving conveyor, and means for moving the discharging conveyor at a different rate of speed than the rate of movement of the receiving conveyor whereby cakes of molded material may be carried against the edges of said receivers.

MARION L. CROUCH.